US011069120B2

(12) United States Patent
Oryoji et al.

(10) Patent No.: US 11,069,120 B2
(45) Date of Patent: *Jul. 20, 2021

(54) IMAGE PROCESSING APPARATUS AND IMAGE PROCESSING METHOD

(71) Applicant: SONY CORPORATION, Tokyo (JP)

(72) Inventors: Hiroshi Oryoji, Kanagawa (JP); Nobuaki Izumi, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/319,411

(22) PCT Filed: Jul. 27, 2017

(86) PCT No.: PCT/JP2017/027263
§ 371 (c)(1),
(2) Date: Jan. 21, 2019

(87) PCT Pub. No.: WO2018/030168
PCT Pub. Date: Feb. 15, 2018

(65) Prior Publication Data
US 2019/0236795 A1    Aug. 1, 2019

(30) Foreign Application Priority Data

Aug. 10, 2016  (JP) .............................. JP2016-157197

(51) Int. Cl.
*G06T 15/04*  (2011.01)
*G06T 1/00*   (2006.01)
(Continued)

(52) U.S. Cl.
CPC ................ *G06T 15/04* (2013.01); *G06T 1/00* (2013.01); *G06T 7/529* (2017.01); *G06T 7/593* (2017.01);
(Continued)

(58) Field of Classification Search
None
See application file for complete search history.

(56) References Cited

U.S. PATENT DOCUMENTS 5,856,829 A * 1/1999 Gray, III ................. G06T 15/04
345/419
2012/0307010 A1* 12/2012 Evertt .................. H04N 13/268
348/46
(Continued)

FOREIGN PATENT DOCUMENTS

CN    103379352 A    10/2013
JP    2013-156955 A   8/2013
JP    2013-225740 A   10/2013

OTHER PUBLICATIONS

Lionel Baboud, Xavier Décoret, "Rendering Geometry with Relief Textures", Jun. 2006, Proceedings of Graphics Interface 2006, pp. 195-201.*

(Continued)

*Primary Examiner* — Robert Bader
(74) *Attorney, Agent, or Firm* — Chip Law Group

(57) ABSTRACT

The present disclosure relates to an image processing apparatus and an image processing method that make it possible to generate an image using texture images and depth images of two viewpoints that represent a three-dimensional structure of a greater number of regions. A selection section selects a quantization method of a depth image of each viewpoint from among a first quantization method that quantizes a reciprocal 1/r of a distance r between a viewpoint corresponding to the depth image and the polygon for each pixel, a second quantization method that quantizes the distance r, and a third quantization method that quantizes a reciprocal 1/r' of a distance r' between the other viewpoint that configures the two viewpoints together with the viewpoint corresponding to the depth image and the polygon in (Continued)

each pixel. The present disclosure can be applied, for example, to a display apparatus and the like.

21 Claims, 28 Drawing Sheets

(51) Int. Cl.
  *G06T 7/529* (2017.01)
  *G06T 7/593* (2017.01)
  *H04N 13/275* (2018.01)
  *H04N 13/111* (2018.01)
  *G06T 15/08* (2011.01)
  *G06T 9/00* (2006.01)

(52) U.S. Cl.
  CPC ............ *G06T 15/08* (2013.01); *H04N 13/111* (2018.05); *H04N 13/275* (2018.05); *G06T 9/001* (2013.01); *G06T 2207/10021* (2013.01); *G06T 2207/10028* (2013.01)

(56) References Cited

U.S. PATENT DOCUMENTS

2013/0278596 A1   10/2013  Wu et al.
2014/0085415 A1*   3/2014  Bici ..................... H04N 19/597
                                                  348/43

OTHER PUBLICATIONS

Alex Butler, Shahram Izadi, Otmar Hilliges, David Molyneaux, Steve Hodges, David Kim, "Shake'n'Sense: Reducing Interference for Overlapping Structured Light Depth Cameras", May 10, 2012, ACM, Proceedings of the SIGCHI Conference on Human Factors in Computing Systems, May 2012, pp. 1933-1936.*

Aljoscha Smolic, "An Overview of 3D Video and Free Viewpoint Video", 2009, Springer, Computer Analysis of Images and Patterns. CAIP 2009. Lecture Notes in Computer Science, vol. 5702. pp. 1-8.*

James F. Blinn, "W Pleasure, W Fun", Jun. 1998, IEEE, IEEE Computer Graphics and Applications, vol. 18, No. 3, pp. 78-82.*

Chunhui Mei, Voicu Popescu, Elisha Sacks, "The Occlusion Camera", Sep. 2005, Computer Graphics Forum, vol. 24, Issue 3, pp. 335-342.*

C. Andújar, J. Boo, P. Brunet, M. Fairén, I. Navazo, P. Vázquez, À. Vinacua, "Omni-directional Relief Impostors", Sep. 2007, Computer Graphics Forum, vol. 26, Issue 3, pp. 553-560.*

Pere-Pau Vazquez, Miquel Feixas, Mateu Sbert, Wolfgang Heidrich, "Automatic View Selection Using Viewpoint Entropy and its Application to Image-Based Modelling", 2003, Computer Graphics Forum, vol. 22, No. 4, pp. 689-700.*

Ingo Schiller, Reinhard Koch, "Datastructures for Capturing Dynamic Scenes with a Time-of-Flight Camera", 2009, Springer, Dynamic 3D Imaging. Dyn3D 2009. Lecture Notes in Computer Science, vol. 5742, pp. 42-57.*

Alexandre Hardy, Johannes Venter, "3-View Impostors", Jun. 2010, ACM, AFRIGRAPH '10: Proceedings of the 7th International Conference on Computer Graphics, Virtual Reality, Visualisation and Interaction in Africa, pp. 129-138.*

Wurong Yu, Bugao Xu, "Surface Reconstruction from Two-view Body Scanner Data", 2008, SAGE Publications, Textile Research Journal, vol. 78, No. 5, pp. 457-466.*

International Search Report and Written Opinion of PCT Application No. PCT/JP2017/027263, dated Sep. 5, 2017, 06 pages of ISRWO.

Senoh, et al., "MPEG Multi-View Image Coding Standardization", 79-90 pages.

Takanori, et al., "3-7 MPEG Multi-View Image Coding Standardization", NICT, pp. 79-90 (English Abstract only).

* cited by examiner

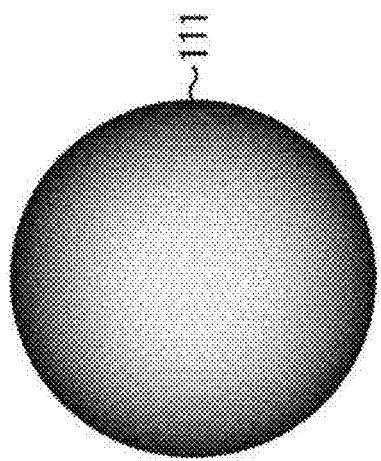
111
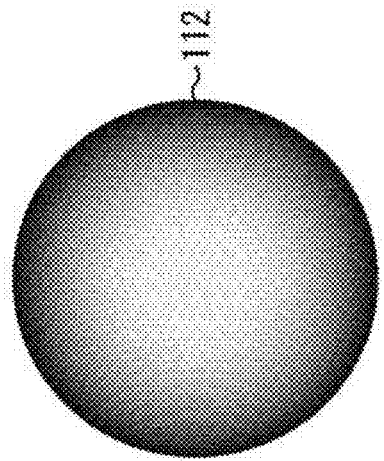
112
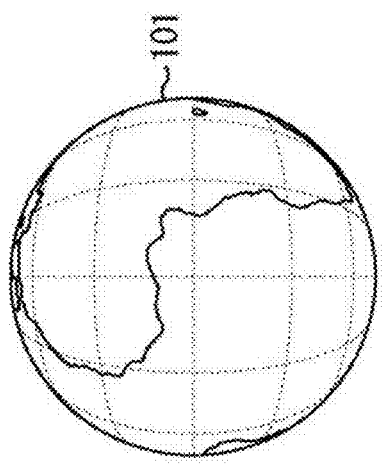
101
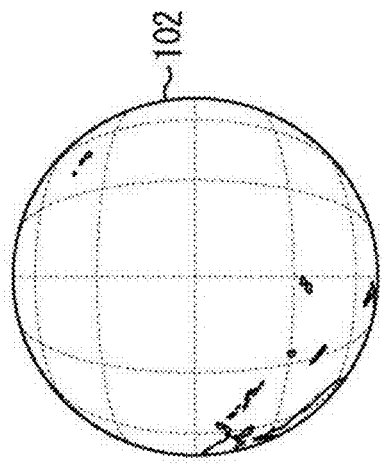
102
FIG. 6A
FIG. 6B

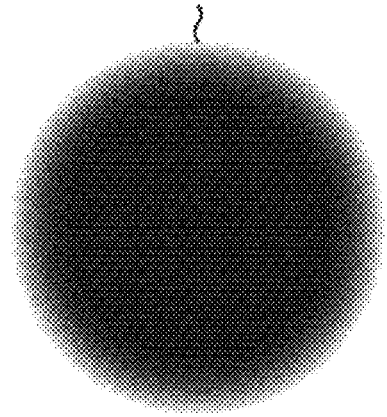
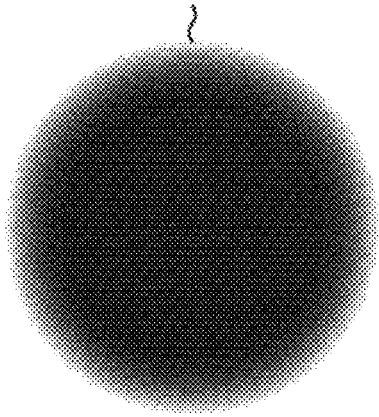
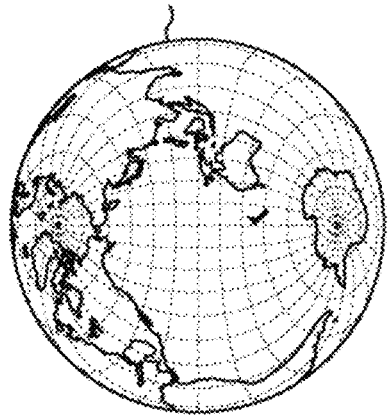
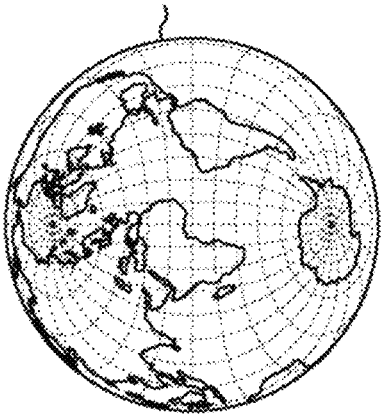
FIG. 11A  FIG. 11B

IMAGE PROCESSING APPARATUS AND IMAGE PROCESSING METHOD

CROSS REFERENCE TO RELATED APPLICATIONS

This application is a U.S. National Phase of International Patent Application No. PCT/JP2017/027263 filed on Jul. 27, 2017, which claims priority benefit of Japanese Patent Application No. JP 2016-157197 filed in the Japan Patent Office on Aug. 10, 2016. Each of the above-referenced applications is hereby incorporated herein by reference in its entirety.

TECHNICAL FIELD

The present disclosure relates to an image processing apparatus and an image processing method, and particularly to an image processing apparatus and an image processing method that make it possible to represent a three-dimensional structure of a greater number of regions using texture images and depth images of two viewpoints.

BACKGROUND ART

As a technique for representing a three-dimensional structure of an object, mainly a technique of representing a three-dimensional structure of an object using a polygon (3D mesh) of the object and a texture pasted to the polygon and a technique of representing a three-dimensional structure of an object using texture images and depth images obtained by perspectively projecting the object with respect to a plurality of viewpoints are available. The former technique is a technique used in a general CG (Computer Graphics) technology. The latter technique (hereinafter referred to as 2D depth technique) is high in affinity for a picked up image that is an image obtained by perspectively projecting an imaging object.

In a case where a three-dimensional structure of an object is represented by the 2D depth technique, data representing the three-dimensional structure is encoded using an encoding method such as MPEG MVD (Moving Picture Experts Group phase Multi-view+depth) (for example, refer to NPL 1).

CITATION LIST

Patent Literature

[NPL 1]
Takanori SENOH, Kenji YAMAMOTO, Ryutaro OI and Taiichiro KURITA "MPEG Multi-View Image Coding Standardization," Journal of the National Institute of Information and Communications Technology Vol. 56 Nos. 1/2, issued March, 2010

SUMMARY

Technical Problem

As described above, the 2D depth technique is a technique of representing a three-dimensional structure of an object using texture images (two-dimensional images) obtained by perspectively projecting the object with respect to a plurality of viewpoints and depth images corresponding to the texture images. Accordingly, the 2D depth technique cannot represent a three-dimensional structure of a region to which the object is not perspectively projected.

Therefore, by increasing the number of viewpoints for perspective projection to increase regions to be perspectively projected, a three-dimensional structure of a greater number of regions can be represented. However, as the number of viewpoints for perspective projection increases, a data amount necessary to represent a three-dimensional structure increases.

The present disclosure has been made in view of such a situation as described above and makes it possible to represent a three-dimensional structure of a greater number of regions using texture images and depth images of two viewpoints.

Solution to Problem

An image processing apparatus of a first aspect of the present disclosure is an image processing apparatus that includes an image generation section configured to generate a texture image of a predetermined viewpoint using a texture image obtained by projecting, to a projection face perpendicular to a sight line direction heading from each of two viewpoints which are opposed to each other across a center of a polygon, toward the center of the polygon, a rear face of the polygon and a depth image corresponding to the texture image of each of the viewpoints, and a quantization section configured to quantize a reciprocal of a distance between the other viewpoint that configures the two viewpoints together with the viewpoint corresponding to the depth image and the polygon in each pixel.

An image processing method of the first aspect of the present disclosure corresponds to the image processing apparatus of the first aspect of the present disclosure.

In the first aspect of the present disclosure, a texture image of a predetermined viewpoint is generated using a texture image obtained by projecting, to a projection face perpendicular to a sight line direction heading from each of two viewpoints, which are opposed to each other across the center of a polygon, toward the center of the polygon, a rear face of the polygon and a depth image corresponding to the texture image of each of the viewpoints. It is to be noted that the quantization method for the depth image of each of the viewpoints is a quantization method that quantizes a reciprocal of a distance between the other viewpoint that configures the two viewpoints together with the viewpoint corresponding to the depth image and the polygon in each pixel.

An image processing apparatus of a second aspect of the present disclosure is an image processing apparatus that includes a texture image generation section configured to project, to a projection face perpendicular to a sight line direction heading from each of two viewpoints which are opposed to each other across a center of a polygon, toward the center of the polygon, a rear face of the polygon to generate a texture image, and a depth image generation section configured to generate a depth image that corresponds to the texture image of each of the viewpoints by setting a quantization value obtained by a quantization method for quantizing a reciprocal of a distance between the other viewpoint that configures the two viewpoints together with the viewpoint corresponding to the depth image and the polygon in each pixel as a pixel value.

An image processing method of the second aspect of the present disclosure corresponds to the image processing apparatus of the second aspect of the present disclosure.

In the second aspect of the present disclosure, to a projection face perpendicular to a sight line direction heading from each of two viewpoints which are opposed to each other across the center of a polygon, toward the center of the polygon, a rear face of the polygon is projected to generate a texture image, and a depth image that corresponds to the texture image of each of the viewpoints is generated by setting a quantization value obtained by a quantization method for quantizing a reciprocal of a distance between the other viewpoint that configures the two viewpoints together with the viewpoint corresponding to the depth image and the polygon in each pixel as a pixel value.

It is to be noted that the image processing apparatus of the first aspect and the second aspect of the present disclosure can be implemented by causing a computer to execute a program.

Further, the program for being executed by a computer in order to implement the information processing apparatus of the first aspect and the second aspect of the present disclosure may be provided by transmission through a transmission medium or by recording the program in a recording medium.

Advantageous Effects of Invention

According to the first aspect of the present disclosure, an image can be generated. According to the first aspect of the present disclosure, an image can be generated using texture images and depth images of two viewpoints representing a three-dimensional structure of a greater number of regions.

Further, according to the second aspect of the present disclosure, an image can be generated. According to the second aspect of the present disclosure, a three-dimensional structure of a greater number of regions can be represented using texture images and depth images of two viewpoints.

It is to be noted that the advantageous effects described here are not necessarily restrictive and may be some advantageous effects described in the present disclosure.

BRIEF DESCRIPTION OF DRAWINGS

FIGS. 6A and 6B are views illustrating a texture image generated by perspectively projecting a front face of each polygon and a depth image corresponding to the texture image.

FIGS. 11A and 11B are views illustrating a texture image generated by perspectively projecting a rear face of each polygon and a depth image corresponding to the texture image.

FIG. 10 is a view illustrating a texture image generated by perspectively projecting a rear face of each polygon and a depth image corresponding to the texture image.

FIG. 11 is a view illustrating a texture image generated by perspectively projecting a rear face of each polygon and a depth image corresponding to the texture image.

FIG. 12 is a view illustrating a texture image generated by perspectively projecting a rear face of each polygon and a depth image corresponding to the texture image.

DESCRIPTION OF EMBODIMENTS

In the following, a mode for carrying out the present disclosure (hereinafter referred to as embodiment) is described. It is to be noted that the description is given in the following order.

Figure 27:
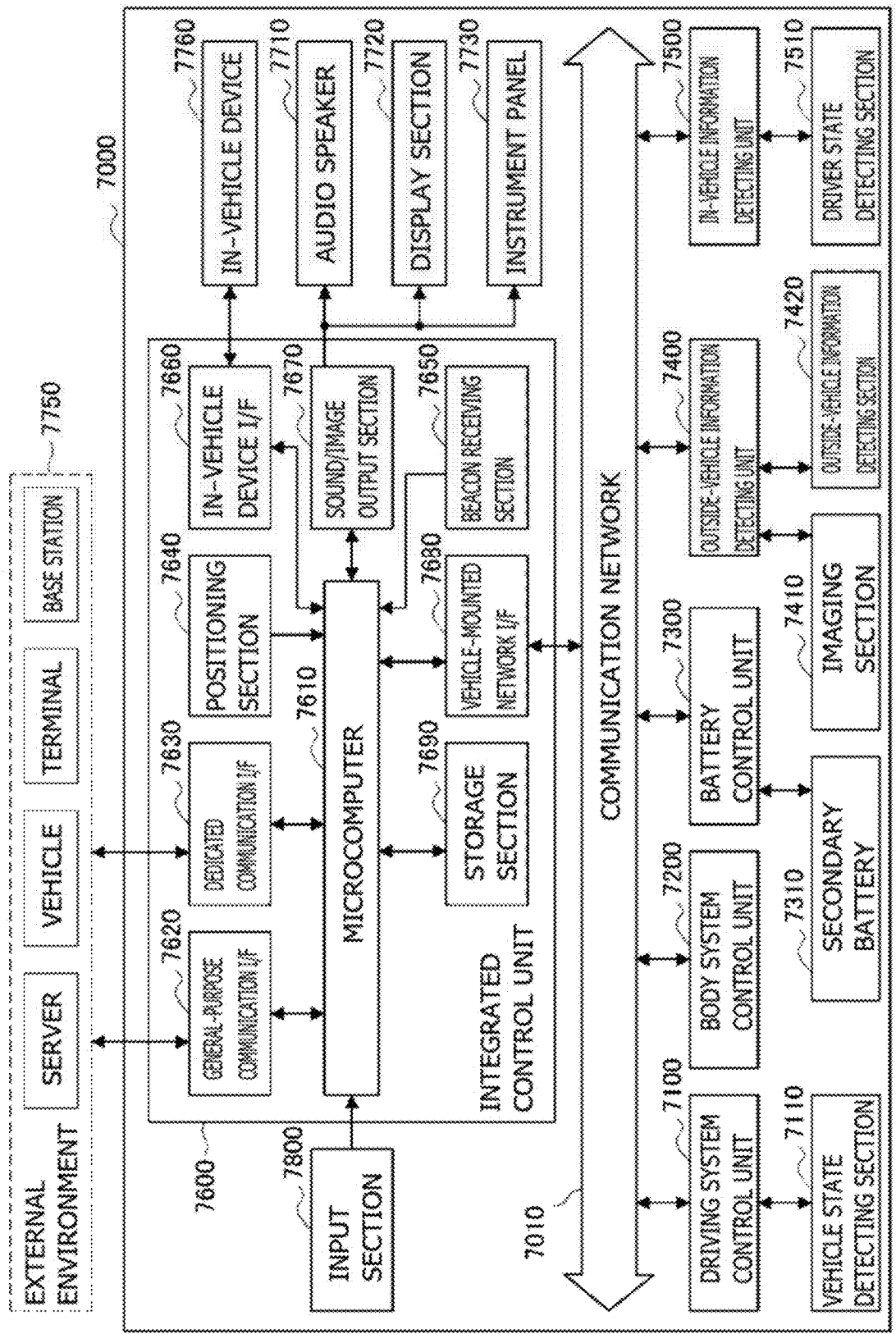
FIG. 27 is a block diagram depicting an example of schematic configuration of a vehicle control system.
Figure 28:
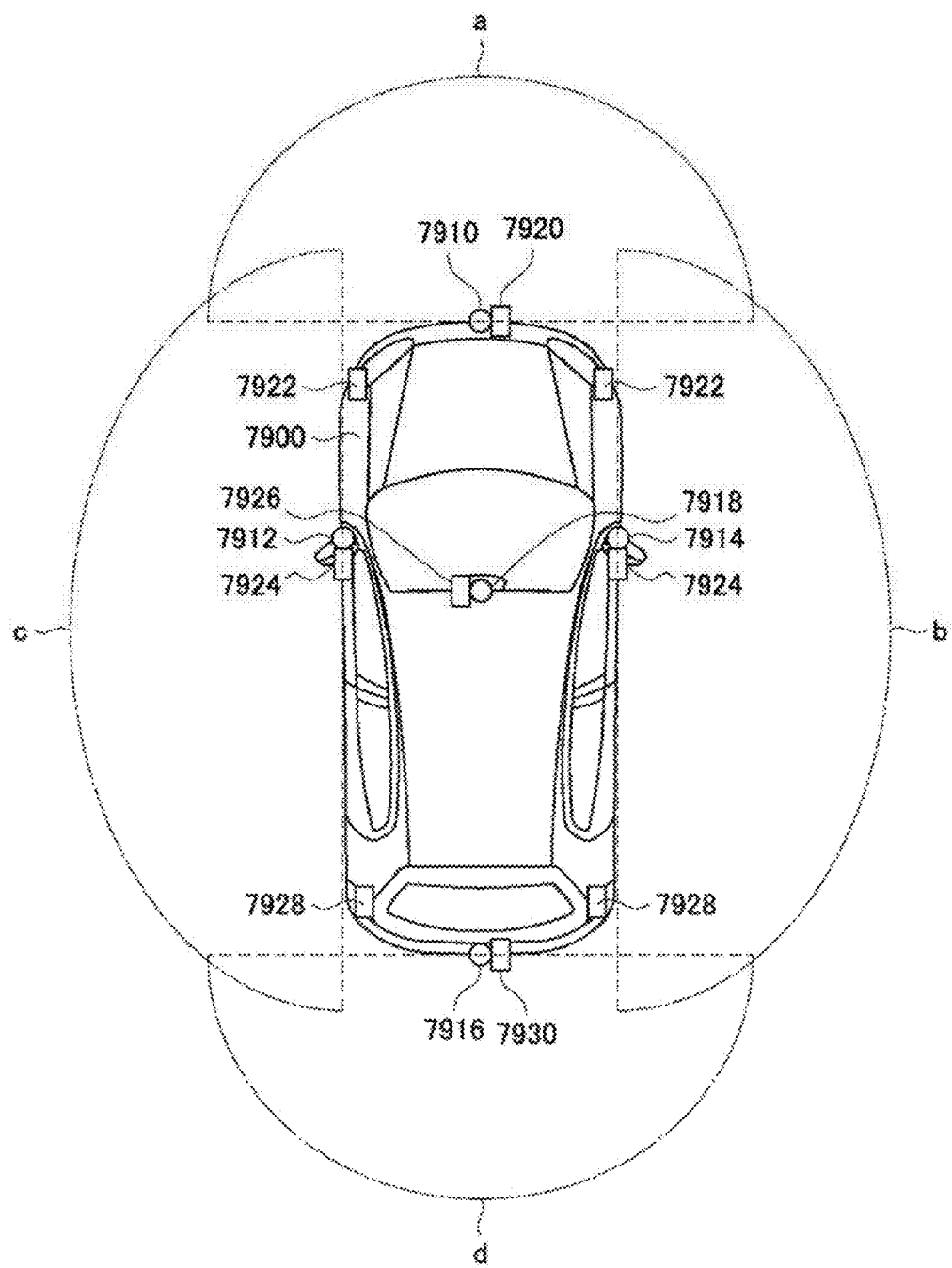
FIG. 28 is a diagram of assistance in explaining an example of installation positions of an outside-vehicle information detecting section and an imaging section.

1. First Embodiment: Generation Apparatus and Display Apparatus (FIGS. 1, 2, 3, 4, 5A, 5B, 5C, 6A, 6B, 7, 8, 9, 10A, 10B, 10C, 11A, 11B, 12A, 12B, 13, 14, 15, 16, 17, 18, 19, 20, 21, and 22)
2. Different Example of Texture Image (FIGS. 23A and 23B)
3. Second Embodiment: tan Axis Projection (FIGS. 24 and 25)
4. Third Embodiment: Computer (FIG. 26)
5. Application Example (FIGS. 27 and 28)

1. First Embodiment (Configuration Example of Generation Apparatus)

Figure 1:
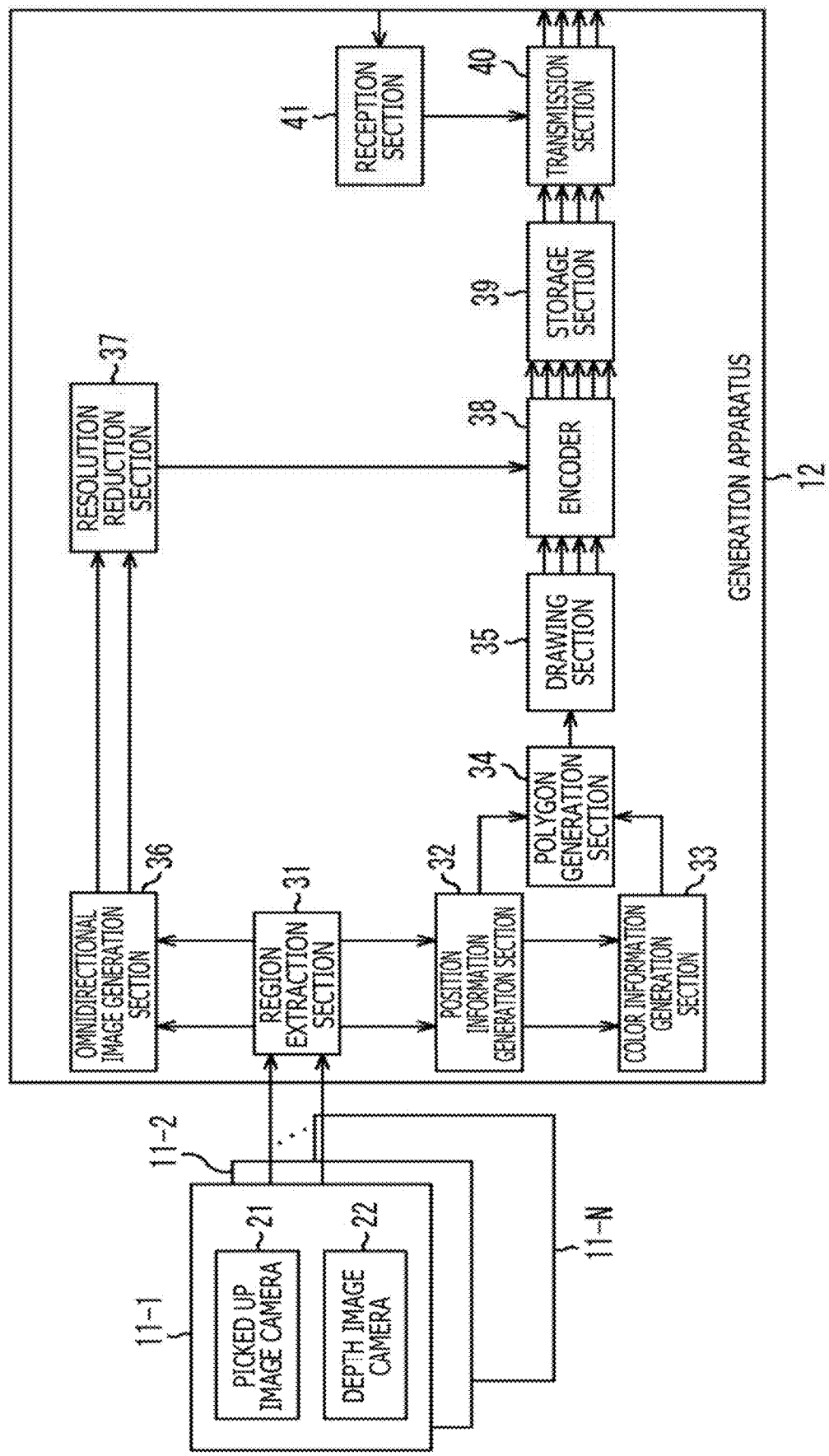
FIG. 1 is a block diagram depicting a configuration example of a first embodiment of a generation apparatus as an image processing apparatus to which the present disclosure is applied.

FIG. 1 is a block diagram depicting a configuration example of a first embodiment of a generation apparatus as an image processing apparatus to which the present disclosure is applied.

The generation apparatus 12 of FIG. 1 uses picked up images and depth images acquired by imaging apparatuses 11-1 to 11-N (N is equal to or greater than 2) to generate a texture image and a depth image of a main imaging object in the picked up images and a texture image and a depth image of an omnidirectional image.

In particular, the imaging apparatuses 11-1 to 11-N are arranged around a main imaging object and include at least part of the main imaging object in an imaging range thereof. Each of the imaging apparatuses 11-1 to 11-N includes an picked up image camera 21 and a depth image camera 22. The picked up image camera 21 images an imaging object to acquire a picked up image in a unit of a frame and supplies the picked up image to the generation apparatus 12. The depth image camera 22 acquires a position in a depth direction of the imaging object at each pixel of the picked up image, generates a depth image in which information representative of the position is used as a pixel value, and supplies the depth image to the generation apparatus 12. It is to be noted that, in the following description, in a case where there is no necessity to specifically distinguish the imaging apparatuses 11-1 to 11-N from each other, they are collectively referred to as an imaging apparatus 11.

The generation apparatus 12 includes a region extraction section 31, a position information generation section 32, a color information generation section 33, a polygon generation section 34, a drawing section 35, an omnidirectional image generation section 36, a resolution reduction section 37, an encoder 38, a storage section 39 and a transmission section 40.

The region extraction section 31 of the generation apparatus 12 extracts a region of a main imaging object from N picked up images and N depth images supplied from the N imaging apparatus 11 and supplies the regions to the position information generation section 32. Further, the region extraction section 31 extracts a region other than the region of the main imaging object as a background region from the N picked up images and the N depth images and supplies the background regions to the omnidirectional image generation section 36.

The position information generation section 32 uses the N depth images of the regions of the main imaging object supplied from the region extraction section 31 to generate position information of one or more polygons corresponding to the main imaging object. The position information of a polygon is three-dimensional coordinates of vertices of the polygon in a 3D model coordinate system that is a three-dimensional coordinate system having an origin at a center of the main imaging object. The position information generation section 32 supplies the position information of each polygon to the color information generation section 33 and the polygon generation section 34. Further, the position information generation section 32 supplies the N picked up images in the regions of the main imaging object to the color information generation section 33.

The color information generation section 33 uses position information of each polygon supplied from the position information generation section 32 and the N picked up images of the main imaging object to generate color information such as RGB values of a front face and a rear face of each polygon. In particular, the color information generation section 33 uses pixel values of the picked up images corresponding to the polygons to generate color information of the front face of each of the polygons. Further, the color information generation section 33 generates color information of the front face of each of the polygons also as color information of the rear face of each of the polygons. The color information generation section 33 supplies each piece of the color information of the front face and the rear face of each of the polygons to the polygon generation section 34.

It is to be noted that the color information of the front face of the polygon is represented by describing three-dimensional coordinates in a 3D model coordinate system of each vertex of the polygon in a clockwise direction around a normal vector to the front face and describing color information in an associated relationship with the three-dimensional coordinates. The color information of the rear face of the polygon is also represented similarly to the color information of the front face.

The polygon generation section 34 generates each of the polygons on the basis of the position information of each of the polygons supplied from the position information generation section 32 and pastes a texture to each of the front face and the rear face of each of the polygons on the basis of the color information of each of the front face and the rear face of each of the polygons supplied from the color information generation section 33. The polygon generation section 34 supplies each of the polygons having the texture pasted to the front face and the rear face of each of the polygons, to the drawing section 35.

The drawing section 35 (image generation section) performs perspective projection of the rear face of each of the polygons to a perspective projection face in regard to each of two viewpoints determined in advance that are opposed to each other across the origin of the 3D model coordinate system that is the center of one or more polygons of the main imaging object to generate texture images of the two viewpoints. In particular, the drawing section 35 perspectively projects, for each of the two viewpoints, the rear face of each polygon to a perspective projection face that is a normal whose center is passed by a straight line in a sight line direction heading from each viewpoint to the origin to generate texture images of the two viewpoints. In the present specification, an "opposed position" not only is an opposed position but also includes the proximity to the opposed position within a range within which a technical effect of the present disclosure is achieved. Similarly, the "normal" includes not only a normal itself but also a line having an angle to the face that is proximate to the vertical.

It is to be noted that, although a format of a texture image is not specifically restricted, the YCbCr420 format can be adopted, for example. The drawing section 35 generates depth images individually corresponding to texture images of two viewpoints by first to third quantization methods on the basis of polygons. The drawing section 35 supplies the texture images of two viewpoints and the depth images generated by the first to third quantization methods to the encoder 38.

The omnidirectional image generation section 36 perspectively projects N picked up images of the background region supplied from the region extraction section 31 to a regular octahedron centered at the origin of the 3D model coordinate system to generate a texture image of an omnidirectional image over 360 degrees around in a horizontal direction and 180 degrees around in a vertical direction. It is to be noted that the omnidirectional image may not be an image of an all space of a sphere over 360 degrees around in a horizontal direction and 180 degrees around in a vertical direction but may be an image of a partial space if the technological effect of the present disclosure is achieved. The omnidirectional image generation section 36 perspectively projects N depth images of the background supplied from the region extraction section 31 to the regular octahedron similarly to the picked up images to generate a depth image of an omnidirectional image. The omnidirectional image generation section 36 supplies the texture image and the depth image of the omnidirectional image to the resolution reduction section 37.

The resolution reduction section 37 converts the texture image and the depth image of the omnidirectional image supplied from the omnidirectional image generation section 36 into those of low resolution and supplies them to the encoder 38.

The encoder 38 encodes the texture images of two viewpoints supplied from the drawing section 35 and the depth images generated by the first to third quantization methods and encodes the texture image and the depth image of the omnidirectional image supplied from the resolution reduction section 37. Although the AVC (Advanced Video Coding) method, HEVC method, MVD method, or the like can be used as the encoding method for encoding of them, it is assumed that the AVC method is used here.

Accordingly, the encoder 38 generates, by encoding, encoded streams of the texture images of the viewpoints (hereinafter referred to as viewpoint texture streams) and encoded streams of the depth images generated by the quantization methods (hereinafter referred to as viewpoint depth streams). Further, the encoder 38 generates, by encoding, an encoded stream of the texture image of the omnidirectional image of the reduced resolution (hereinafter referred to as an omnidirectional texture stream) and an encoded stream of the depth image of the omnidirectional image of the reduced resolution (hereinafter referred to as an omnidirectional depth stream). The encoder 38 supplies the viewpoint texture streams of two viewpoints and the viewpoint depth streams generated by the first to third quantization methods as well as the omnidirectional texture stream and the omnidirectional depth stream to the storage section 39.

The storage section 39 stores the viewpoint texture streams of two viewpoints and the viewpoint depth streams generated by the first to third quantization methods as well as the omnidirectional texture stream and the omnidirectional depth stream supplied thereto from the encoder 38.

The transmission section 40 reads out and transmits, for each viewpoint, the viewpoint depth streams generated by the quantization method indicated by quantization method information supplied from a reception section 41 from among the viewpoint depth streams generated by the first to third quantization methods stored in the storage section 39. Further, the transmission section 40 reads out and transmits the viewpoint texture streams of two viewpoints stored in the storage section 39 as well as the omnidirectional texture stream and the omnidirectional depth stream.

The reception section 41 receives and supplies, for each viewpoint, the quantization method information transmitted thereto from a display apparatus hereinafter described and indicative of the quantization method corresponding to the display image from among the first to third quantization methods to the transmission section 40.

The generation apparatus 12 converts polygons and color information representative of a three-dimensional structure of a main imaging object into texture images and depth images of two viewpoints in such a manner as described above. Accordingly, the generation apparatus 12 can encode the texture images and the depth images of two viewpoints using a generally used image encoding method to reduce the data amount of them. As a result, a transmission bandwidth of data representing the three-dimensional structure of the main imaging object can be reduced.

It is to be noted that, although the generation apparatus 12 of FIG. 1 generates the polygons and color information, the generation apparatus 12 may generate some other information of a point cloud or the like as long as it is information that represents a three-dimensional structure used in the CG technology.

Further, while, in the example of FIG. 1, the depth image camera 22 acquires a depth image of a pixel number equal to that of a picked up image, in a case where the depth image camera 22 acquires a depth image of a pixel number smaller than that of a picked up image, a depth image interpolation section interpolating pixel values of a depth image is provided between the region extraction section 31 and the position information generation section 32. In this case, the depth image interpolation section interpolates pixel values of a depth image to make the pixel number of the depth image equal to the pixel number of the picked up image.

Furthermore, while, in the example of FIG. 1, each imaging apparatus 11 acquires a depth image, the depth image may be generated from picked up images acquired from an imaging apparatus 11 corresponding to the depth image and a different imaging apparatus 11.

Further, while, in the example of FIG. 1, the drawing section 35 generates a depth image by all of the first to third quantization methods, only the quantization method indicated by the quantization method information received by the reception section 41 may be used to generate a depth image.

(Arrangement Example of Image Pickup Apparatus)

Figure 2:
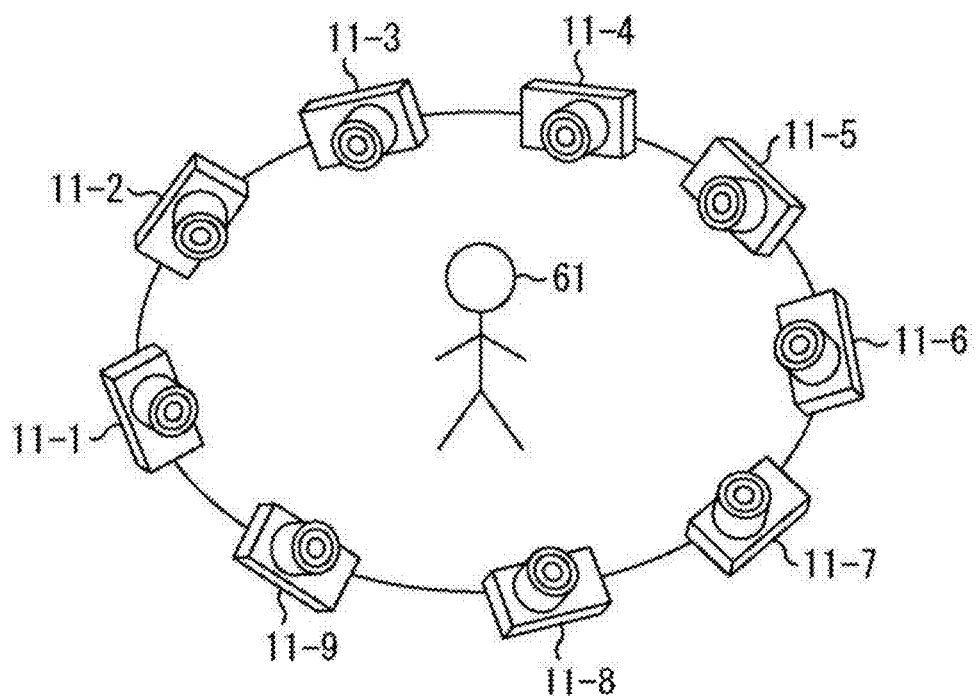
FIG. 2 is a view depicting an arrangement example of an imaging apparatus.

FIG. 2 is a view depicting an arrangement example of the imaging apparatus 11 of FIG. 1.

In the example of FIG. 2, N is 9.

As depicted in FIG. 2, the nine imaging apparatuses 11-1 to 11-9 are arranged so as to surround a main imaging object 61.

(Configuration Example of Drawing Section)

Figure 3:
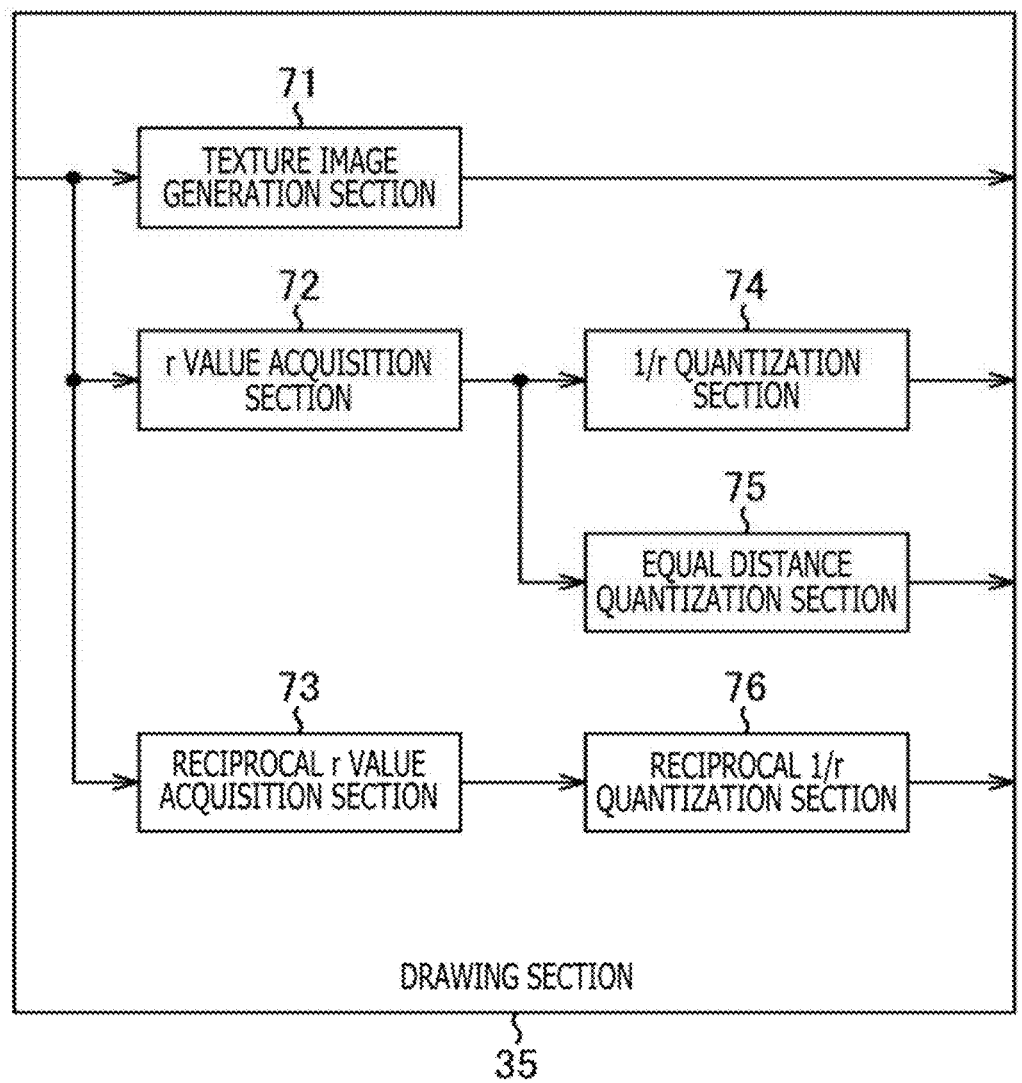
FIG. 3 is a block diagram depicting a configuration example of a drawing section of FIG. 1.

FIG. 3 is a block diagram depicting a configuration example of the drawing section 35 of FIG. 1.

The drawing section 35 of FIG. 3 includes a texture image generation section 71, an r value acquisition section 72, a reciprocal r value acquisition section 73, a 1/r quantization section 74, an equal distance quantization section 75 and a reciprocal 1/r quantization section 76.

The texture image generation section 71 of the drawing section 35 generates texture images of two viewpoints by perspectively projecting, for each of the two viewpoints, the rear face of each polygon supplied from the polygon generation section 34 of FIG. 1 to a perspective projection face and supplies the texture images of two viewpoints to the encoder 38 of FIG. 1.

The r value acquisition section 72 calculates, for each of the two viewpoints, a distance r of a straight line interconnecting, on the basis of each of the polygons supplied from the polygon generation section 34, one of the two viewpoints and a polygon at each pixel of a texture image. The r value acquisition section 72 supplies the distance r of each pixel of each viewpoint to the 1/r quantization section 74 and the equal distance quantization section 75.

The reciprocal r value acquisition section 73 calculates, for each of the two viewpoints, the distance r' of a straight line interconnecting, on the basis of each of the polygons supplied from the polygon generation section 34, the other one of the two viewpoints and a polygon at each pixel of the texture image. The relationship between the distance r and the distance r' is represented by the following expression (1).

$$r' = r_{max} + r_{min} - r \quad (1)$$

It is to be noted that $r_{max}$ and $r_{min}$ are a maximum value and a minimum value of the distance r at all pixels of the texture image, respectively. The reciprocal r value acquisition section 73 supplies the distance r' of each pixel of each viewpoint to the reciprocal 1/r quantization section 76.

The 1/r quantization section 74 (depth image generation section) quantizes, for each viewpoint, a reciprocal of the distance r of each of the pixels supplied from the r value acquisition section 72 in accordance with the following expression (2) by the first quantization method for quantizing a reciprocal of the distance r to calculate a value $I_{d1}(r)$ after quantization.

[Math. 1]

$$I_{d1}(r) = \text{round}\left[255\left(\frac{1}{r} - \frac{1}{r_{max}}\right) \bigg/ \left(\frac{1}{r_{min}} - \frac{1}{r_{max}}\right)\right] \quad (2)$$

The 1/r quantization section 74 generates, for each viewpoint, a depth image in which each pixel value is given as the value $I_{d1}(r)$ after quantization of each pixel and supplies the depth images to the encoder 38 of FIG. 1.

The equal distance quantization section 75 (depth image generation section) quantizes, for each viewpoint, the distance r of each of the pixels supplied from the r value acquisition section 72 in accordance with the following expression (3) by the second quantization method for quantizing the distance r to calculate a value $I_{d2}(r)$ after quantization.

[Math. 2]

$$I_{d2}(r) = \text{round}\ [255(r - r_{min})/(r_{max} - r_{min})] \quad (3)$$

The equal distance quantization section 75 generates, for each viewpoint, a depth image in which each pixel value is given as the value $I_{d2}(r)$ after quantization of each pixel and supplies the depth images to the encoder 38.

The reciprocal 1/r quantization section 76 (depth image generation section) quantizes, for each viewpoint, a reciprocal of the distance r' of each of the pixels supplied from the reciprocal r value acquisition section 73 in accordance with the following expression (4) by the third quantization method for quantizing a reciprocal of the distance r' to calculate a value $I_{d3}(r')$ after quantization.

[Math. 3]

$$I_{d3}(r') = \text{round}\left[255\left(\frac{1}{r'} - \frac{1}{r'_{max}}\right) \bigg/ \left(\frac{1}{r'_{min}} - \frac{1}{r'_{max}}\right)\right] \quad (4)$$

The reciprocal 1/r quantization section 76 generates, for each viewpoint, a depth image in which each pixel value is given as the value $I_{d3}(r')$ after quantization of each pixel and supplies the depth images to the encoder 38.

(Description of Distance r)

Figure 4:
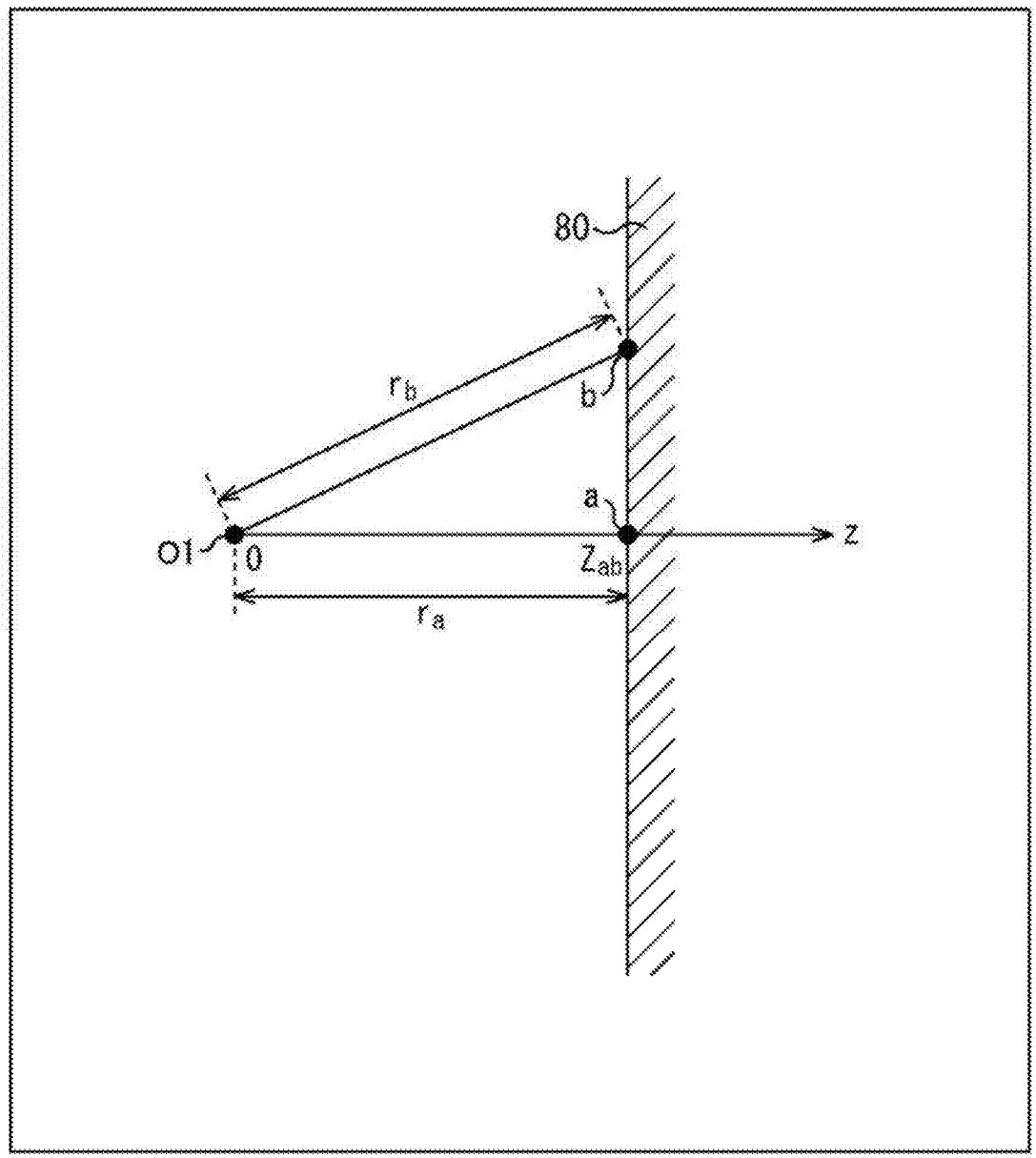
FIG. 4 is a view illustrating a distance r.

FIG. 4 is a view illustrating the distance r.

In the example of FIG. 4, a polygon generated by the polygon generation section 34 forms a face 80 perpendicular to a depth direction z at a position whose distance to a viewpoint O1 in the depth direction z of a texture image at the viewpoint O1 is $z_{ab}$.

In this case, the distance $r_a$ that is the distance r of a pixel whose polygon on the texture image of the viewpoint O1 is a point a on the face 80 crossing with the depth direction z is a distance of a straight line in the depth direction z interconnecting the viewpoint O1 and the point a and is the distance $z_{ab}$.

Meanwhile, the distance $r_b$ that is the distance r of a pixel whose polygon on the texture image of the viewpoint O1 is a point b different from the point a on the face 80 is a distance of a straight line in a direction different from the depth direction z interconnecting the viewpoint O1 and the point b and is not the distance $z_{ab}$.

DESCRIPTION OF EFFECT OF PRESENT DISCLOSURE

FIGS. 5A, 5B, 5C, 6A, 6B, and 7 are views illustrating, for each of two viewpoints opposing to each other across the origin of a 3D model coordinate system, a texture image generated by perspectively projecting the front face of each polygon to a perspective projection face and a depth image corresponding to the texture image.

Figure 5A:
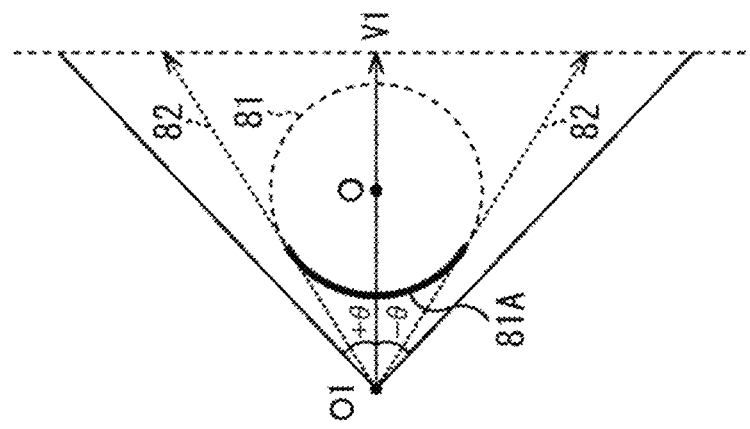
FIGS. 5A, 5B, and 5C are views illustrating a texture image generated by perspectively projecting a front face of each polygon and a depth image corresponding to the texture image.

In the examples of FIGS. 5A, 5B, 5C, 6A, 6B, and 7, a polygon of a main imaging object forms a sphere 81. In this instance, as depicted in FIG. 5A, in a texture image generated by perspectively projecting a front face of the sphere 81 with respect to a perspective projection face in a sight line direction V1 from the viewpoint O1 that is one of the two viewpoints, a texture pasted to a region 81A on the front face of the sphere 81 that crosses first with each of projection directions 82 is drawn. The projection directions are directions that extend from the viewpoint and are within a range in which an absolute value of an angle defined with respect to the sight line direction is equal to one-half of a field angle (θ, in the example of FIG. 3). Further, the depth image corresponding to the texture image is an image representative of the position in the depth direction (sight line direction V1) of the region 81A with respect to the viewpoint O1.

Figure 5B:
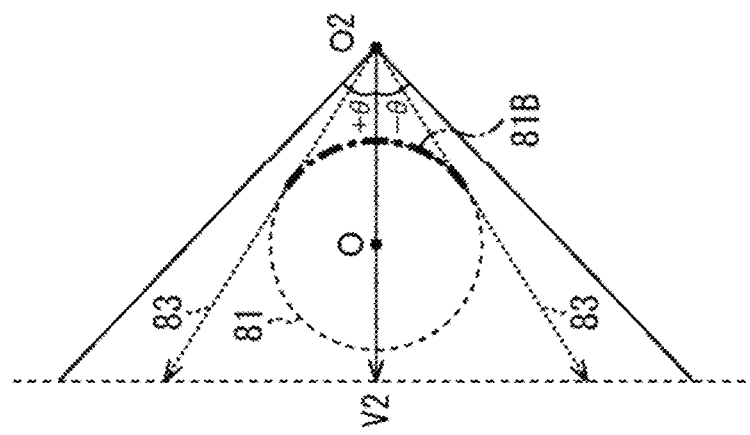

Further, as depicted in FIG. 5B, in a texture image generated by perspectively projecting the front face of the sphere 81 to a perspective projection face in a sight line direction V2 from the viewpoint O2 that is the other one of the two viewpoints, a texture pasted to a region 81B on the front face of the sphere 81 that crosses first with each of projection directions 83 is drawn. Further, the depth image corresponding to the texture image is an image representative of the position in the depth direction (sight line direction V2) of the region 81B with respect to the viewpoint O2.

Figure 5C:
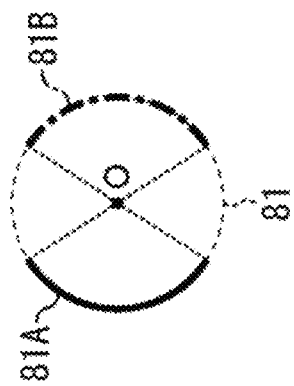

Accordingly, as depicted in FIG. 5C, the texture image and the depth image from the viewpoint O1 and the texture image and the depth image from the viewpoint O2 can be used to represent a three-dimensional structure of the two regions 81A and 81B opposing to each other across a center of the sphere 81. However, on the surface of the sphere, a region other than the region 81A and the region 81B exists. In other words, a region of the surface of the sphere 81 with which a three-dimensional structure cannot be represented by the texture image and the depth image from the viewpoint O1 and the texture image and the depth image from the viewpoint O2 exists.

For example, in a case where a world map is applied as a texture to the front face and a rear face of the sphere 81 and the sky above the Atlantic Ocean off the coast of Africa is the viewpoint O1, part of the Continent of Africa and the South American Continent pasted as a texture to the front face of the region 81A is drawn in a texture image 101 of the viewpoint O1 as depicted on the left side in FIG. 6A.

Further, in this case, the viewpoint O2 is in the sky above the Pacific Ocean, and part of the Australia Continent pasted as a texture to the front face of the region 81B is drawn in a texture image 102 of the viewpoint O2 as depicted on the left side in FIG. 6B. However, the Antarctica and the like are not drawn in any of the texture image 101 and the texture image 102.

Further, as depicted on the right side in FIG. 6A and on the right side in FIG. 6B, a depth image 111 corresponding to the texture image 101 and another depth image 112 corresponding to the texture image 102 are same. It is to be noted that, in a depth image, as the distance of the position in the depth direction of an imaging object at each pixel increases, the pixel value (luminance value) decreases. Accordingly, in the depth image 111 and the depth image 112, the pixel value is highest at the center and decreases as the distance from the center increases.

Figure 7:
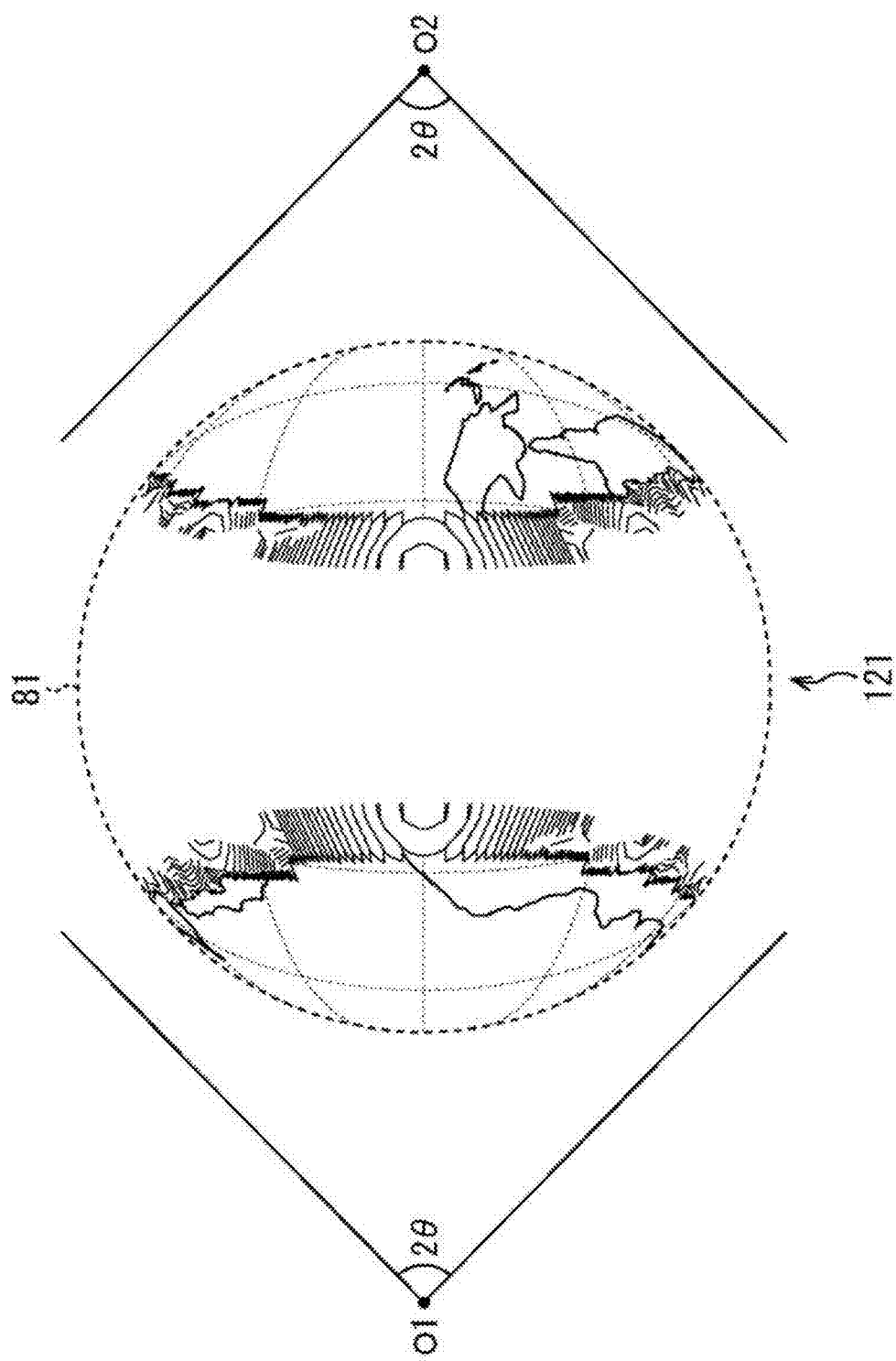
FIG. 7 is a view illustrating a texture image generated by perspectively projecting a front face of each polygon and a depth image corresponding to the texture image.

In this manner, in any of the texture image 101 and the texture image 102, the Antarctica and the like are not drawn. Accordingly, as depicted in FIG. 7, a three-dimensional structure 121 reconstructed using the texture image 101 and the depth image 111 as well as the texture image 102 and the depth image 112 is only part of the sphere 81 having the world map pasted to the front face and the rear face as a texture.

While, in the example of FIGS. 5A, 5B, 5C, 6A, 6B, and 7, the shape of the polygon is the comparatively simple sphere 81, in a case where the shape of the polygon is complicated, a region of the polygon whose three-dimensional structure cannot be represented by texture images of two viewpoints increases.

Figure 8:
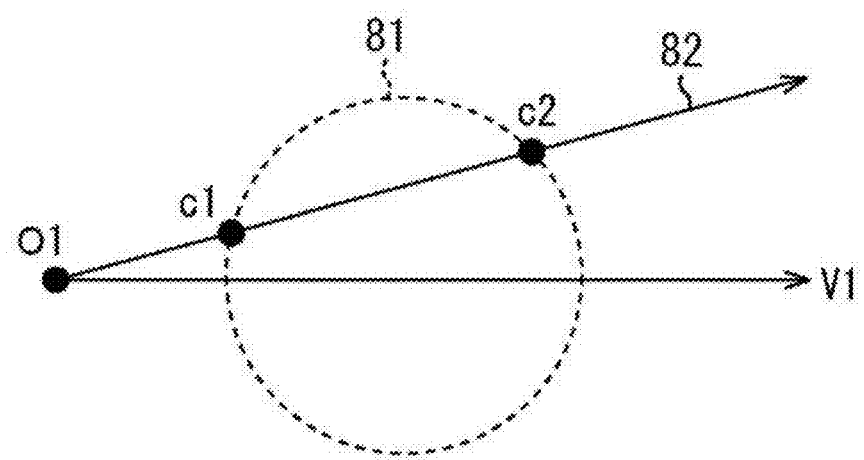
FIG. 8 is a view illustrating a texture image generated by perspectively projecting a rear face of a sphere and a depth image corresponding to the texture image.
Figure 9:
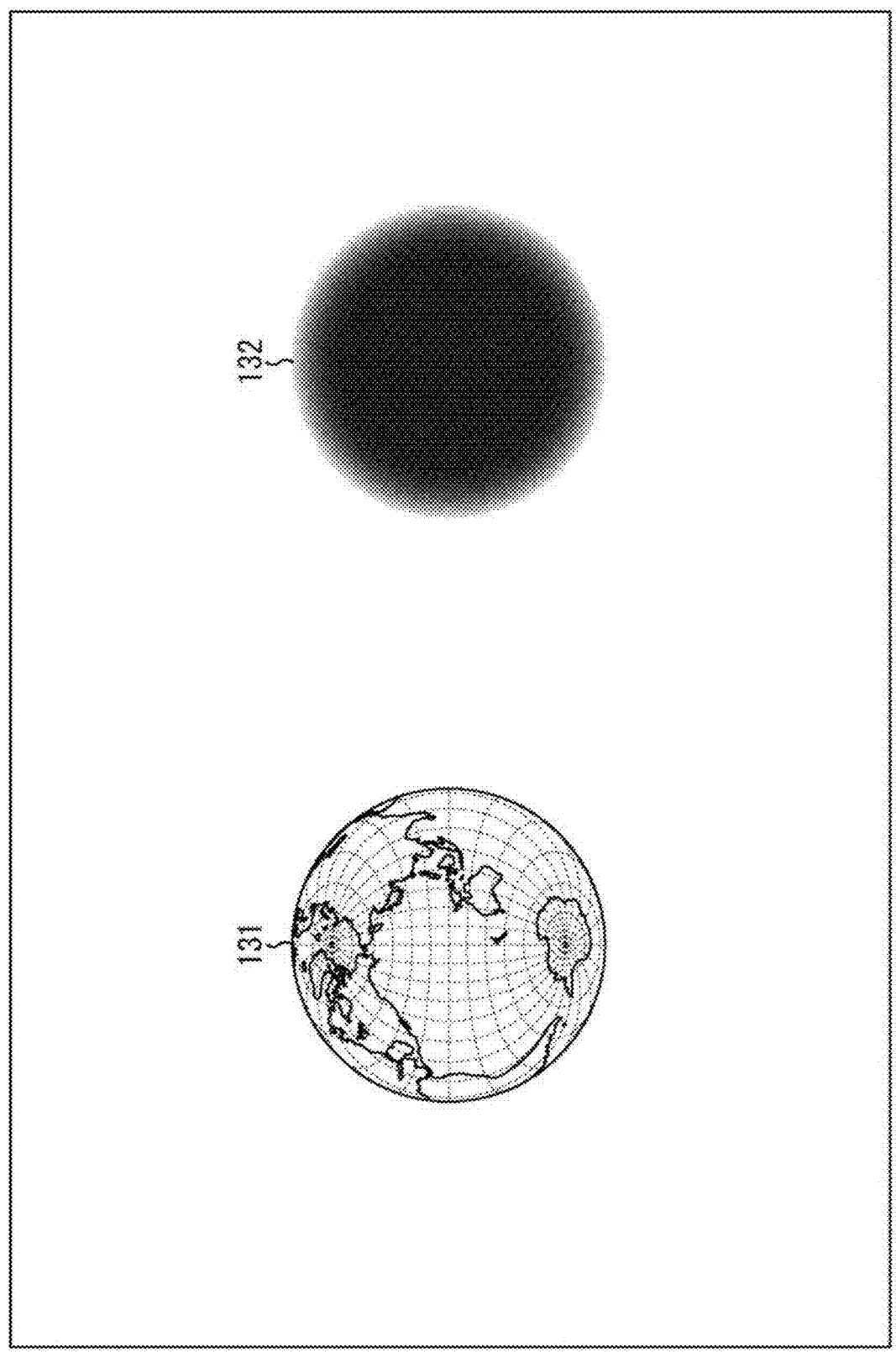
FIG. 9 is a view illustrating a texture image generated by perspectively projecting a rear face of a sphere and a depth image corresponding to the texture image.

FIGS. 8 and 9 are views illustrating a texture image generated by perspectively projecting the rear face of the sphere 81 with respect to the viewpoint O1 to a perspective projection face in the sight line direction V1 and a depth image corresponding to the texture image.

As described hereinabove, in a case where a texture image is generated by perspectively projecting the front face of the sphere 81 to the perspective projection face in the sight line direction V1 with respect to the viewpoint O1, a texture applied to each of points c1 on the front face of the sphere 81 with which each of the projection directions 82 first crosses is drawn in the texture image as depicted in FIG. 8. Further, the depth image corresponding to this texture image is an image representative of the position in the depth direction (sight line direction V1) at each point c1 with respect to the viewpoint O1.

On the other hand, in a case where a texture image is generated by perspectively projecting the rear face of the sphere 81 to the perspective projection face in the sight line direction V1 with respect to the viewpoint O1, a texture applied to each of the points c2 on the rear face of the sphere 81 with which each of the projection directions 82 first crosses is drawn in the texture image as depicted in FIG. 8. Further, the depth image corresponding to this texture image is an image representative of the position in the depth direction (sight line direction V1) at each point c2 with respect to the viewpoint O2.

For example, in a case where a world map is pasted as a texture to the front face and the rear face of the sphere 81 and the sky above the Atlantic Ocean off the coast of Africa is the viewpoint O1, as depicted in FIG. 9, to a texture image 131 of the viewpoint O1, the North American Continent, part of the South American Continent, the Antarctica, part of the European Continent, the Asia Continent and the Australia Continent pasted as a texture to the rear face of each of the points c2 are drawn. Further, in a depth image 132 corresponding to the texture image 131, the pixel value is lowest at the center and decreases as the distance from the center increases.

FIGS. 10A, 10B, 10C, 11A, 11B, 12A, and 12B are views illustrating, for each of two viewpoints opposing to each other across the origin of a 3D model coordinate system, a texture image generated by perspectively projecting the rear face of a polygon to a perspective projection face and a depth image corresponding to the texture image.

Figure 10C:
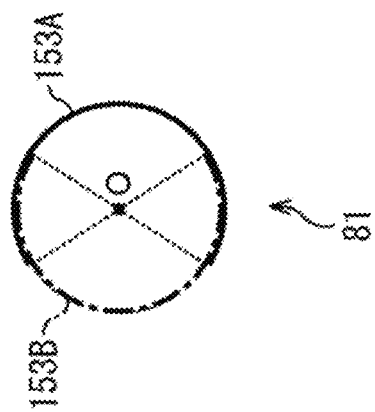
FIGS. 10A, 10B, and 10C are views illustrating a texture image generated by perspectively projecting a rear face of each polygon and a depth image corresponding to the texture image.
Figure 10B:
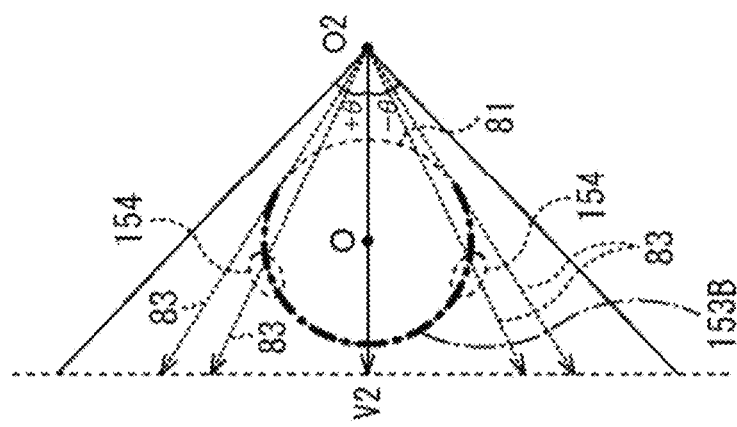
Figure 10A:
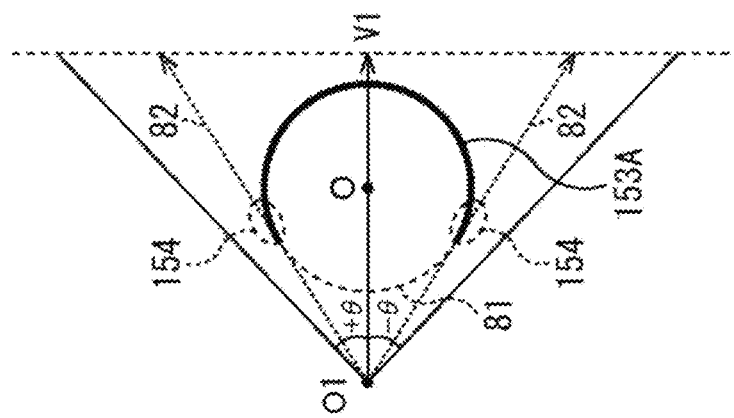

In the example of FIGS. 10A, 10B, 10C, 11A, 11B, 12A, and 12B, the polygon of the main imaging object is a sphere 81. In this case, as depicted in FIG. 10A, to a texture image generated by perspectively projecting the rear face of the sphere 81 to a perspective projection face in a sight line direction V1 with respect to the viewpoint O1, a texture pasted to a region 153A of the rear face on the sphere 81 with which each of the projection directions 82 crosses first is drawn. Further, a depth image corresponding to the texture image is an image representative of the position in the depth direction (sight line direction V1) of the region 81A with respect to the viewpoint O1.

Meanwhile, as depicted in FIG. 10B, to a texture image generated by perspectively projecting the rear face of the sphere 81 to a perspective projection face in a sight line direction V2 with respect to the other viewpoint O2 of the two viewpoints, a texture pasted to a region 153B of the rear face on the sphere 81 with which each of the projection directions 83 crosses first is drawn. Further, a depth image corresponding to the texture image is an image representative of the position in the depth direction (sight line direction V2) of the region 81B with respect to the viewpoint O2.

Accordingly, as depicted in FIG. 8C, a three-dimensional structure of the two regions 153A and 153B opposed to each other across the center of the sphere 81 can be represented with the texture image and the depth image of the viewpoint O1 and the texture image and the depth image of the viewpoint O2.

It is to be noted that, as depicted in FIG. 10C, the region 153A and the region 153B overlap with each other. Accordingly, a three-dimensional structure of the entire sphere 81 can be represented with the texture image and the depth image of the viewpoint O1 and the texture image and the depth image of the viewpoint O2.

For example, in a case where a world map is applied as a texture to the front face and the face of the sphere 81 and the sky above the Atlantic Ocean off the coast of Africa is the viewpoint O1, the North American Continent, part of the South American Continent, the Antarctica, part of the European Continent, the Asia Continent and the Australia Continent pasted as a texture to the rear face of the region 153A are drawn in a texture image 161 of the viewpoint O1 as depicted on the left side in FIG. 11A.

Further, in this case, the viewpoint O2 is in the sky above the Pacific Ocean, and the Africa Continent, the North American Continent, the South American Continent, the *Antarctica* and part of the European Continent pasted as a texture to the rear face of the region 153B are drawn in a texture image 162 of the viewpoint O2 as depicted on the left side in FIG. 11B. Accordingly, all of the seven continents are drawn in at least one of the texture image 161 and the texture image 162.

Further, as depicted on the right side in FIG. 11A and FIG. 11B, a depth image 163 corresponding to the texture image 161 and a depth image 164 corresponding to the texture image 162 are same. In the depth image 163 and the depth image 164, the pixel value is highest at the center and decreases as the distance from the center increases.

Figure 12B:
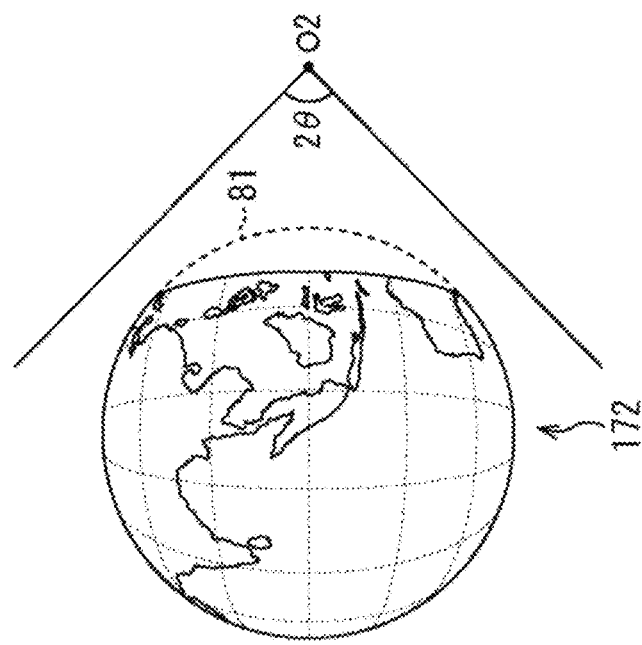
FIGS. 12A and 12B are views illustrating a texture image generated by perspectively projecting a rear face of each polygon and a depth image corresponding to the texture image.
Figure 12A:
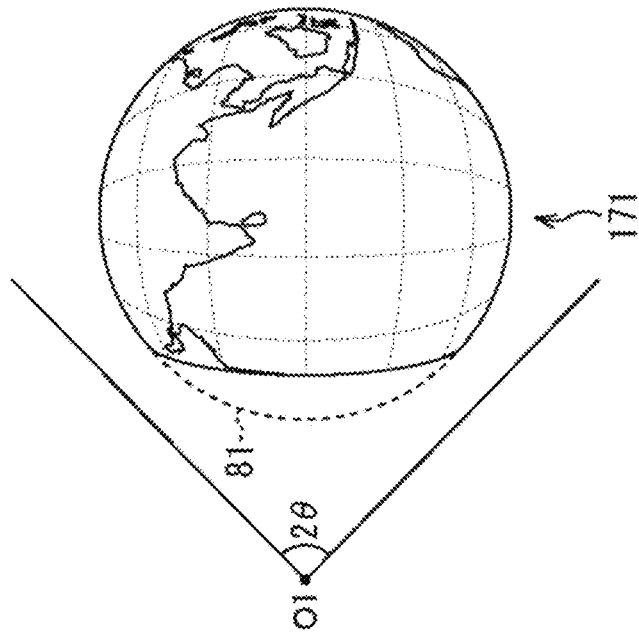

All of the seven continents are drawn in at least one of the texture image 161 and the texture image 162 in such a manner as described above. Accordingly, as depicted in FIG. 12A, a three-dimensional structure 171 reconstructed using the texture image 161 and the depth image 163 is a portion greater than one-half of the sphere 81 on the viewpoint O2 side (right half in the figure). Meanwhile, as depicted in FIG. 12B, a three-dimensional structure 172 reconstructed using the texture image 162 and the depth image 164 is a portion greater than one half the sphere 81 on the viewpoint O1 side (left half in the figure). Therefore, by reconstructing the three-dimensional structures using the texture image 161 and the depth image 163 as well as the texture image 162 and the depth image 164, the entire sphere 81 can be generated.

It is to be noted that the overlapping portion of the region 153A and the region 153B is generated using the texture image 161 and the depth image 163 or the texture image 162 and the depth image 164.

For example, as depicted in FIG. 10A, in a case where each region 154 of end portions of the region 153A within the overlapping region of the region 153A and the region 153B is perspectively projected with respect to the viewpoint O1, the angle with respect to a projection direction 82 is small. Accordingly, with the texture image 161 and the depth image 163, a three-dimensional structure of the region 154 can be represented with high accuracy.

However, in a case where the region 154 is perspectively projected with respect to the viewpoint O2 as depicted in FIG. 10B, the angle of the region 154 with respect to a projection direction 83 is greater in comparison with that in a case where it is perspectively projected with respect to the viewpoint O1. Accordingly, with the texture image 162 and the depth image 164, a three-dimensional structure of the region 154 can be represented with higher accuracy in comparison with the texture image 161 and the depth image 163. Therefore, the region 154 is generated using the texture image 162 and the depth image 164.

By generating the overlapping region of the region 153A and the region 153B using one of the texture image 161 and the depth image 163 and the texture image 162 and the depth image 164, which corresponds to a projection direction having a greater angle with respect to the overlapping region, the accuracy in reconstruction of the sphere 81 can be improved.

(Description of Processing of Generation Apparatus)

Figure 13:
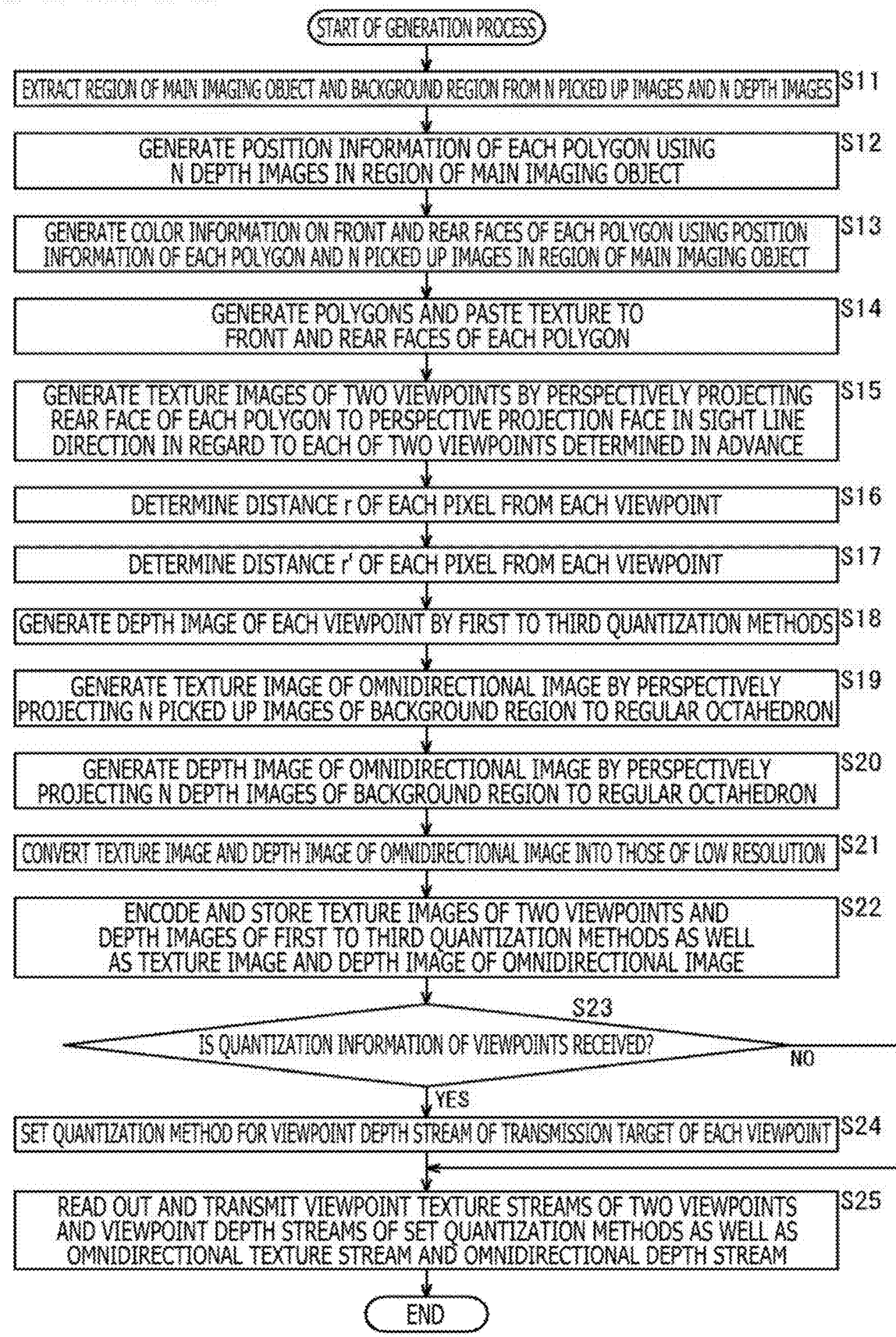
FIG. 13 is a flow chart illustrating a generation process.

FIG. 13 is a flow chart illustrating a generation process by the generation apparatus 12 of FIG. 1. This generation process is performed for each of frames of N picked up images and N depth images acquired by the N imaging apparatus 11.

At step S11 of FIG. 13, the region extraction section 31 of the generation apparatus 12 extracts a region of a main imaging object and a background region from N picked up images and N depth images supplied from the imaging apparatus 11. The region extraction section 31 supplies the N picked up images and depth images in the region of the main imaging object to the position information generation section 32 and supplies the N picked up images and depth images in the background region to the omnidirectional image generation section 36.

At step S12, the position information generation section 32 uses the N depth images in the region of the main imaging object supplied from the region extraction section 31 to generate position information of each of polygons of the main imaging object and supplies the position information to the color information generation section 33 and the drawing section 35. Further, the position information generation section 32 supplies the N picked up images in the region of the main imaging object to the color information generation section 33.

At step S13, the color information generation section 33 uses the position information of each of the polygons and the N picked up images in the region of the main imaging object supplied from the position information generation section 32 to generate color information of the front face and the rear face of each of the polygons. The color information generation section 33 supplies the color information of the front face and the rear face of each of the polygons to the drawing section 35.

At step S14, the drawing section 35 generates polygons on the basis of the position information of each of the polygons supplied from the position information generation section 32 and pastes a texture to the front face and the rear face of each of the polygons on the basis of the color information of the front face and the rear face of each of the polygons supplied from the color information generation section 33.

At step S15, the texture image generation section 71 (FIG. 3) of the drawing section 35 generates texture images of two viewpoints determined in advance by perspectively projecting, for each of the two viewpoints, the rear face of each of the polygons to a perspective projection face in the sight line direction. The drawing section 35 supplies the texture images of two viewpoints to the encoder 38.

At step S16, the r value acquisition section 72 calculates the distance r of each pixel of each viewpoint on the basis of the polygons supplied thereto from the polygon generation section 34 and supplies the distances r to the 1/r quantization section 74 and the equal distance quantization section 75.

At step S17, the reciprocal r value acquisition section 73 calculates the distance r' of each pixel of each viewpoint on the basis of the polygons supplied from the polygon generation section 34 and supplies the distances r' to the reciprocal 1/r quantization section 76.

At step S18, the 1/r quantization section 74 generates a depth image by calculating a value $I_{d1}(r)$ after quantization by the first quantization method for each viewpoint and supplies the depth image to the encoder 38. Further, the equal distance quantization section 75 calculates a value $I_{d2}(r)$ after quantization by the second quantization method for each viewpoint to generate a depth image and supplies the depth image to the encoder 38. Furthermore, the reciprocal 1/r quantization section 76 calculates a value $I_{d3}(r')$ after quantization by the third quantization method to generate a depth image and supplies the depth image to the encoder 38.

At step S19, the omnidirectional image generation section 36 generates a texture image of an omnidirectional image by perspectively projecting the N picked up images in the background region supplied from the region extraction section 31 to a regular octahedron centered at the origin of the 3D model coordinate system and supplies the texture image of the omnidirectional image to the resolution reduction section 37.

At step S20, the omnidirectional image generation section 36 perspectively projects the N depth images in the background region supplied from the region extraction section 31 to the regular octahedron similarly to the picked up images to generate a depth image of an omnidirectional image and supplies the depth image of the omnidirectional image to the resolution reduction section 37.

At step S21, the resolution reduction section 37 converts the texture image and the depth image of the omnidirectional image supplied from the omnidirectional image generation section 36 into those of a lower resolution and supplies the texture image and the depth image of the omnidirectional image of the reduced resolution to the encoder 38.

At step S22, the encoder 38 encodes and supplies the texture images of two viewpoints and the depth images of the first to third quantization methods as well as the texture image and the depth image of the omnidirectional image to the storage section 39 to be stored.

At step S23, the reception section 41 decides whether or not quantization information of each viewpoint is transmitted thereto from a display apparatus hereinafter described. In a case where it is decided at step S23 that quantization information of each viewpoint is transmitted thereto, the reception section 41 receives and supplies the quantization information of each viewpoint to the transmission section 40.

Then at step S24, the transmission section 40 sets, for each viewpoint, the quantization method of the viewpoint depth stream of the transmission target to the quantization method indicated by the quantization information supplied from the reception section 41 and advances the processing to step S25.

On the other hand, in a case where it is decided at step S23 that quantization information is not transmitted thereto, the transmission section 40 sets the quantization method set when a frame preceding to the frame of the current processing target is set as the processing target, as the quantization method for the frame of the current processing target. Then, the processing advances to step S25.

At step S25, the transmission section 40 reads out the viewpoint texture streams of two viewpoints and the viewpoint depth streams of the set quantization method as well as the omnidirectional texture stream and the omnidirectional depth stream stored in the storage section 39 and transmits them. Then, the processing ends.

The generation apparatus 12 generates texture images and depth images of two viewpoints by perspectively projecting, for each of the two viewpoints opposed to each other across the origin of the 3D model coordinate system, the rear face of a polygon to the perspective projection face in the sight line direction of each viewpoint in such a manner as described above. Accordingly, the generated texture images and depth images of two viewpoints can represent a three-dimensional structure of a polygon of a main imaging object in a greater number of regions in comparison with an alternative case in which they are generated by perspectively projecting the front face of the polygon.

Further, the generation apparatus 12 generates a depth image by the first to third quantization methods. Accordingly, a display apparatus hereinafter described can generate, from viewpoint depth streams of the first to third quantization methods, a display image selectively using a viewpoint depth stream of a quantization method suitable for the display image.

(Configuration Example of Display Apparatus)

Figure 14:
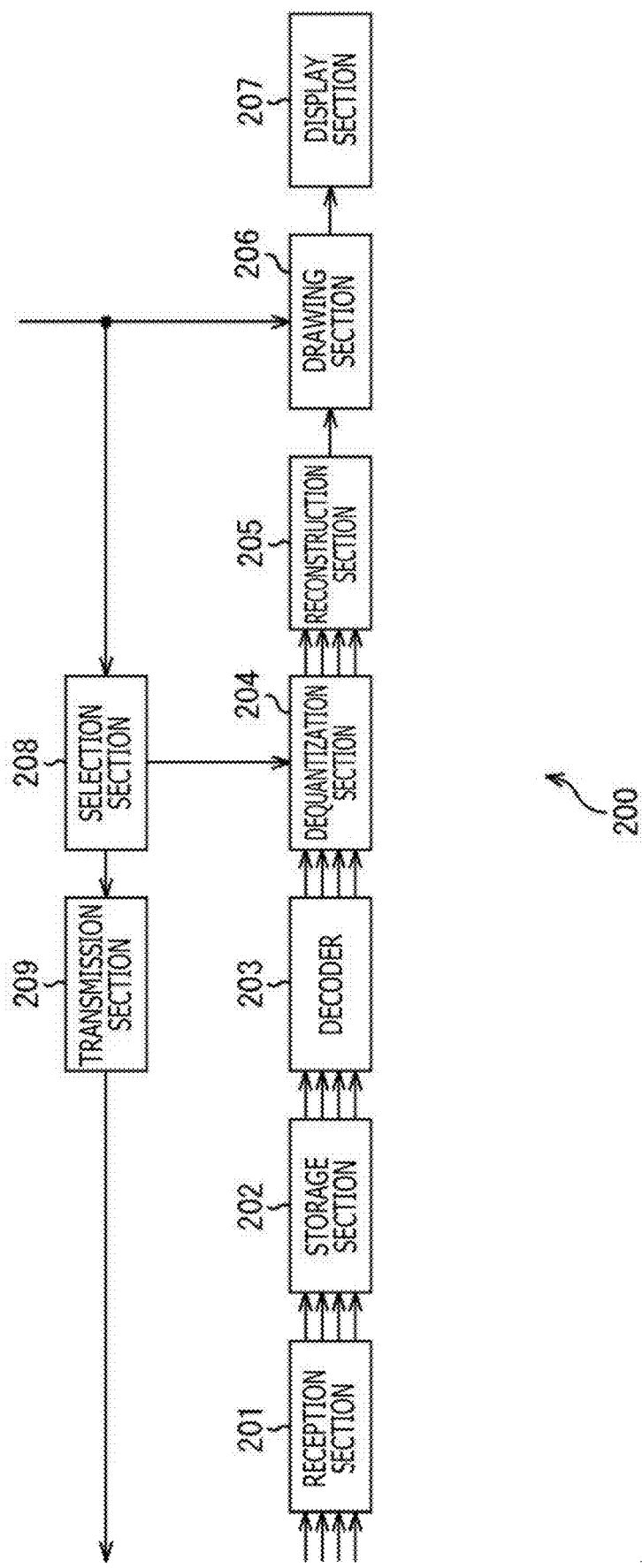
FIG. 14 is a block diagram depicting a configuration example of a first embodiment of a display apparatus as an image processing apparatus to which the present disclosure is applied.

FIG. 14 is a block diagram depicting a configuration example of the first embodiment of a display apparatus as an image processing apparatus to which the present disclosure is applied.

The display apparatus 200 of FIG. 14 receives viewpoint texture streams of two viewpoints and viewpoint depth streams of a predetermined quantization method as well as an omnidirectional texture stream and an omnidirectional depth stream transmitted from the generation apparatus 12 of FIG. 1 to generate a texture image of a predetermined viewpoint as a display image.

In particular, the display apparatus 200 includes a reception section 201, a storage section 202, a decoder 203, a dequantization section 204, a reconstruction section 205, a drawing section 206, a display section 207, a selection section 208, and a transmission section 209.

The reception section 201 of the display apparatus 200 receives viewpoint texture streams and viewpoint depth streams of two viewpoints as well as the omnidirectional texture stream and the omnidirectional depth stream transmitted from the generation apparatus 12 and supplies them to the storage section 202.

The storage section 202 stores the viewpoint texture streams and the viewpoint depth streams of two viewpoints as well as the omnidirectional texture stream and the omnidirectional depth stream supplied from the reception section 201.

The decoder 203 reads outs the viewpoint texture streams and viewpoint depth streams of two viewpoints as well as the omnidirectional texture stream and the omnidirectional depth stream from the storage section 202 and decodes them. The decoder 203 supplies the texture images and the depth images of two viewpoints as well as the omnidirectional texture image and omnidirectional depth image obtained as a result of the decoding to the reconstruction section 205. Further, the decoder 203 supplies the depth images of two viewpoints obtained as a result of the decoding to the dequantization section 204.

The dequantization section 204 dequantizes, for each viewpoint, the depth images of two viewpoints supplied from the decoder 203 by a dequantization method corresponding to the quantization method indicated by the quantization informant supplied from the selection section 208 to generate distance information of each pixel. The distance information is, in a case where the quantization information indicates the first quantization method, a reciprocal 1/r of the distance r, and is, in a case where the quantization information indicates the second quantization method, the distance r, but is, in a case where the quantization information indicates the third quantization method, a reciprocal 1/r' of the distance r'. The dequantization section 204 supplies the distance information of each of the pixels of the depth images of two viewpoints to the reconstruction section 205.

The reconstruction section 205 reconstructs a three-dimensional structure of a main imaging object in the 3D model coordinate system using the distance information of each of the pixels of the texture images and the depth images of two viewpoints. As described hereinabove, the texture images and the depth images of two viewpoints generated by the generation apparatus 12 can represent a three-dimensional structure of a polygon of a main imaging object in a greater number of regions in comparison with an alternative case in which they are generated by perspectively projecting the front face of the polygon. Accordingly, the number of regions of a main imaging object in which a three-dimensional structure is reconstructed using the decoded texture images and the depth images of two viewpoints is greater than that in an alternative case in which the texture images and the depth images of two viewpoints are generated by perspectively projecting a front face of a polygon.

Further, the reconstruction section 205 reconstructs a three-dimensional structure of the background region in the 3D model coordinate system using the texture image and the depth image of the omnidirectional image supplied from the decoder 203. The reconstruction section 205 supplies the position information and the color information of the three-dimensional structures of the main imaging objects and the background region to the drawing section 206.

The drawing section 206 (image generation section) generates, on the basis of the position information and the color information of the three-dimensional structures of the main imaging object and the background region supplied from the reconstruction section 205, a texture image of the viewpoint, the sight line direction, and the field angle in the 3D model coordinate system designated by a viewer or the like as a display image. The drawing section 206 supplies the generated display image to the display section 207.

The display section 207 displays the display image supplied from the drawing section 206. Consequently, the viewer can view the main imaging object from an arbitrary position, for example, around the main imaging object.

The selection section 208 calculates, on the basis of the viewpoint and the sight line direction in the 3D model coordinate system designated by the viewer or the like, the angle defined by the depth direction (sight line direction) of the texture image and the depth direction of the display image for each viewpoint as a display change angle. The selection section 208 selects, for each viewpoint, the quantization method for the depth image from among the first to third quantization methods on the basis of the display change angle. The selection section 208 generates and supplies the quantization information of the selected quantization method to the dequantization section 204 and the transmission section 209.

It is to be noted here that, although description continues assuming that the selection section 208 selects a quantization method for the depth image from among the first to third quantization methods to perform quantization, also it is possible to configure the selection section 208 as a quantization section in which one quantization method from among the first to third quantization methods is set in advance such that the quantization section performs quantization by the set quantization method.

Further, while description here continues assuming that a quantization method is selected from among the first to third quantization methods on the basis of the display change angle for each viewpoint, a quantization method may be selected on the basis of a predetermined condition other than the display change angle.

The transmission section 209 transmits the quantization information supplied from the selection section 208 to the generation apparatus 12 of FIG. 1.

(Description of Selection of Quantization Method)

FIGS. 15 to 18 are views illustrating selection of a quantization method by the selection section 208 of FIG. 14.

Figure 15:
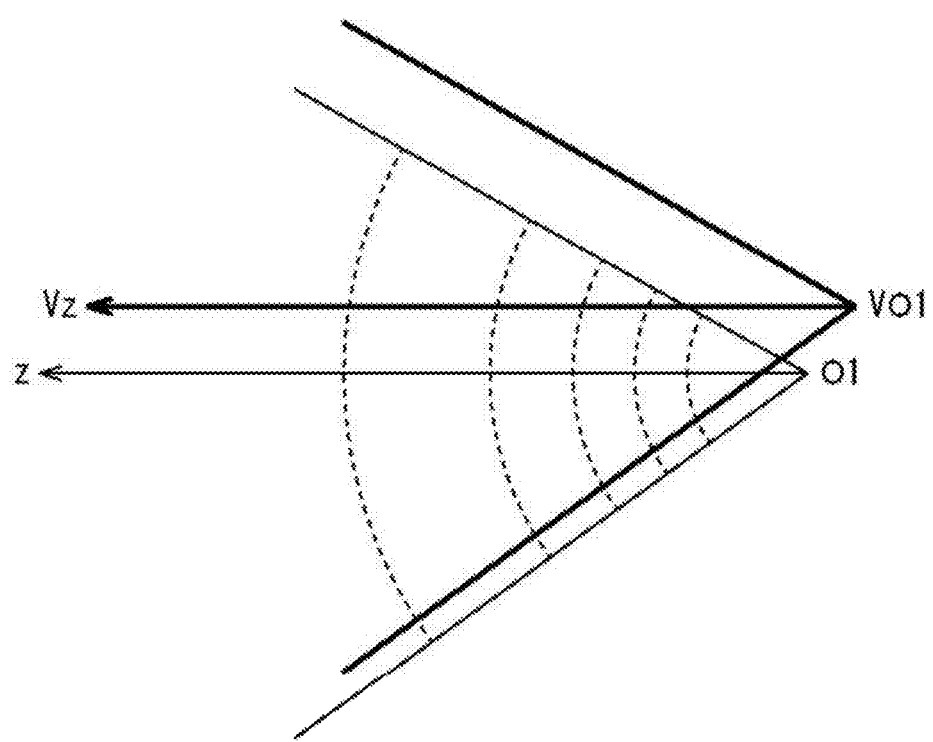
FIG. 15 is a view illustrating selection of a quantization method.

In a case where a depth image of the viewpoint O1 is generated by the first quantization method, equal pixel value lines indicative of positions within a field angle corresponding to values of a predetermined distance from among values that can be assumed as pixel values of the depth image are arcs of circles centered at the viewpoint O1 as indicated by broken lines in FIG. 15. Further, in the first quantization method, since the reciprocal 1/r of the distance r is quantized, the distance between the equal pixel value lines decreases toward the viewpoint O1.

Accordingly, in a case where the display change angle defined by a depth direction Vz of a display image of a viewpoint VO1 and the depth direction z of a texture image of the viewpoint O1 is close to 0 degrees as depicted in FIG. 15 (in the example of FIG. 15, 0 degrees), namely, in a case where the depth direction Vz and the depth direction z are close to each other, the distance between the equal pixel value lines decreases toward the viewpoint VO1. In other words, for an imaging object that is closer to the viewpoint VO1 and stands out in the display image, the quantization step of a depth image decreases. As a result, the picture quality of the display image can be enhanced.

Also in a case where the display change angle is close to 360 degrees, since the depth direction Vz and the depth direction z are close to each other similarly as in the case where the display change angle is close to 0 degrees, a picture quality of a display image can be enhanced by generating a depth image by the first quantization method. Therefore, in a case where the display change angle is equal to or greater than 0 degrees but is smaller than φ1 (0<φ1<90) (first threshold value) degrees or is equal to or greater than φ4 (270<φ4<360) degrees (second threshold value) but is smaller than 360 degrees as depicted in FIG. 18, the selection section 208 selects the first quantization method.

Figure 16:
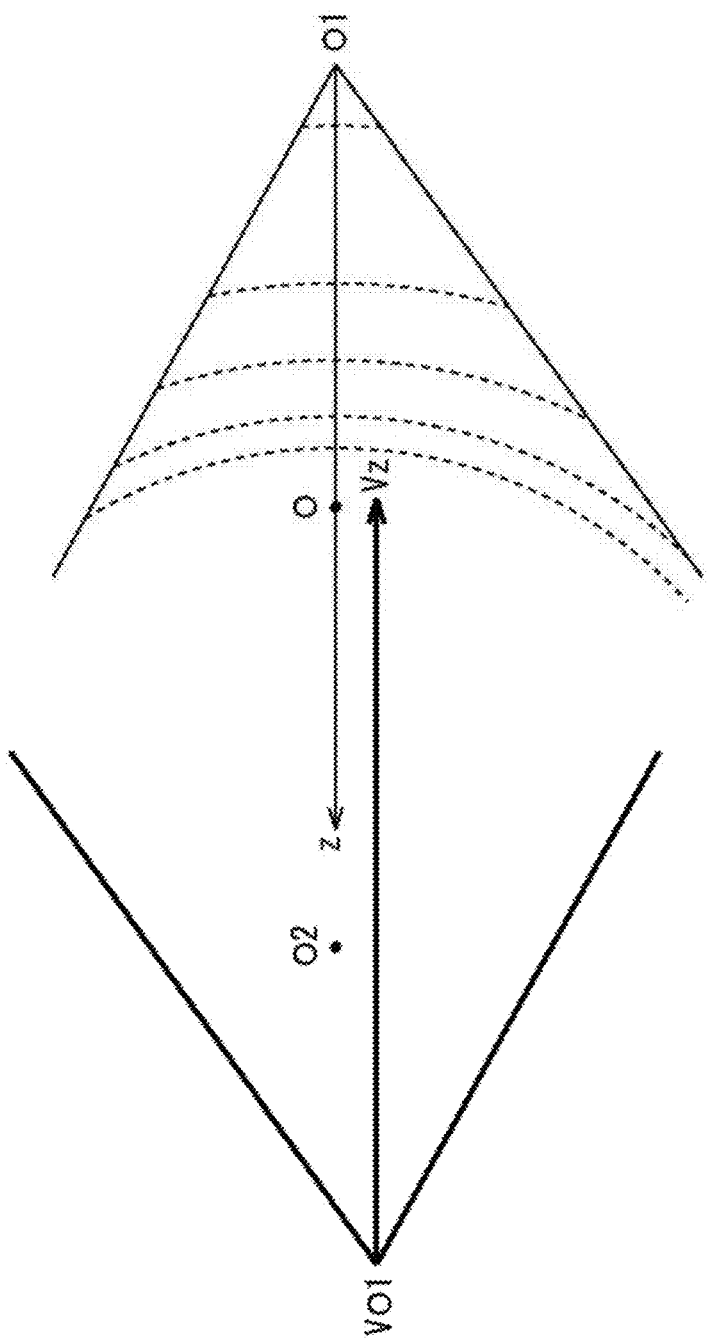
FIG. 16 is a view illustrating selection of a quantization method.

In contrast, in a case where a depth image of the viewpoint O1 is generated by the third quantization method, as indicated by broken lines in FIG. 16, equal pixel value lines are arcs of circles centered at the viewpoint O2 opposing to the viewpoint O1 across the origin O as indicated by broken lines in FIG. 16. Further, according to the third quantization method, since the reciprocal 1/r' of the distance r' is quantized, the distance between the equal pixel value lines decreases toward the viewpoint O2, namely, as the distance from the viewpoint O1 increases.

Accordingly, in a case where the display change angle defined by the depth direction Vz of the display image of the viewpoint VO1 and the depth direction z of the depth image of the viewpoint O1 is close to 180 degrees as depicted in FIG. 16 (in the example of FIG. 15, 180 degrees), namely, in a case where the depth direction Vz and the opposite direction to the depth direction z are close to each other, the distance between the equal pixel value lines decreases toward the viewpoint VO1. In other words, for an imaging object that is closer to the viewpoint VO1 and stands out in the display image, the quantization step of the depth image decreases. As a result, the picture quality of the display image can be enhanced.

Figure 18:
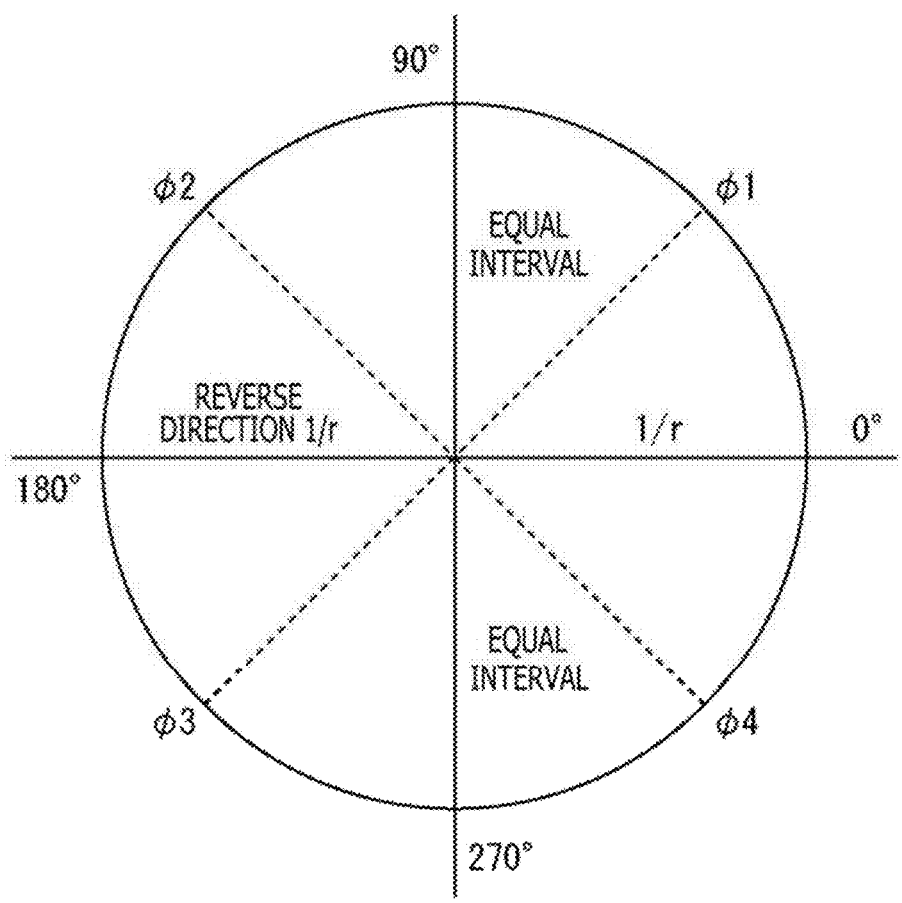
FIG. 18 is a view illustrating selection of a quantization method.

Accordingly, as depicted in FIG. 18, the selection section 208 selects the third quantization method in a case where the display change angle is equal to or greater than φ2 (90<φ2<180) (third threshold value) degrees but is smaller than φ3 (180<φ3<270) (fourth threshold value) degrees.

Figure 17:
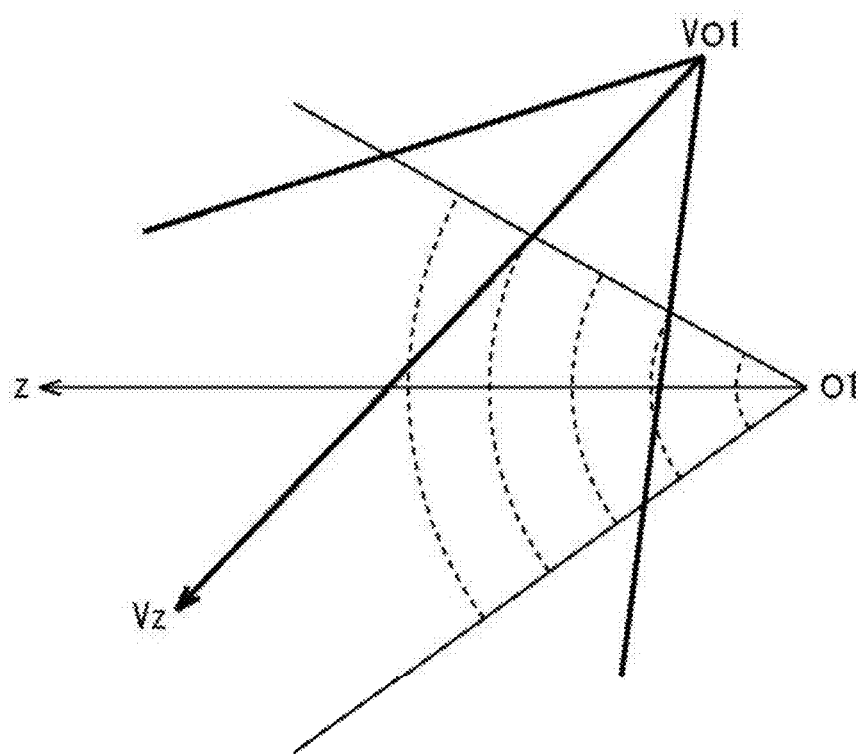
FIG. 17 is a view illustrating selection of a quantization method.

In a case where the depth image of the viewpoint O1 is generated by the second quantization method, equal pixel value lines are arcs of circles centered at the viewpoint O1 as indicated by broken lines of FIG. 17. Further, since, according to the second quantization method, the distance r is quantized, the distances between the equal pixel value lines are each an equal distance.

Accordingly, in a case where the display change angle defined by the depth direction Vz of the display image of the viewpoint VO1 and the depth direction z of the depth image of the viewpoint O1 is close to 270 degrees as depicted in FIG. 17, or in a case where the display change angle is close to 90 degrees, namely, in a case where the depth direction Vz is not close to any of the forward direction and the opposite direction to the depth direction z, the selection section 208 selects the second quantization method. Specifically, in a case where there is no superiority in the first or the third quantization method, the selection section 208 selects the second quantization method. In particular, in a case where the display change angle is equal to or greater than $\varphi 1$ degrees but is smaller than $\varphi 2$ degrees or is equal to or greater than $\varphi 3$ degrees but is smaller than $\varphi 4$ degrees as depicted in FIG. 18, the selection section 208 selects the second quantization method.

The selection section 208 selects the first to third quantization methods in such a manner as described above, and accordingly, it can be prevented that, in the display image, the quantization step becomes rougher toward the viewpoint VO1.

(Description of First Reconstruction Method)

Figure 19:
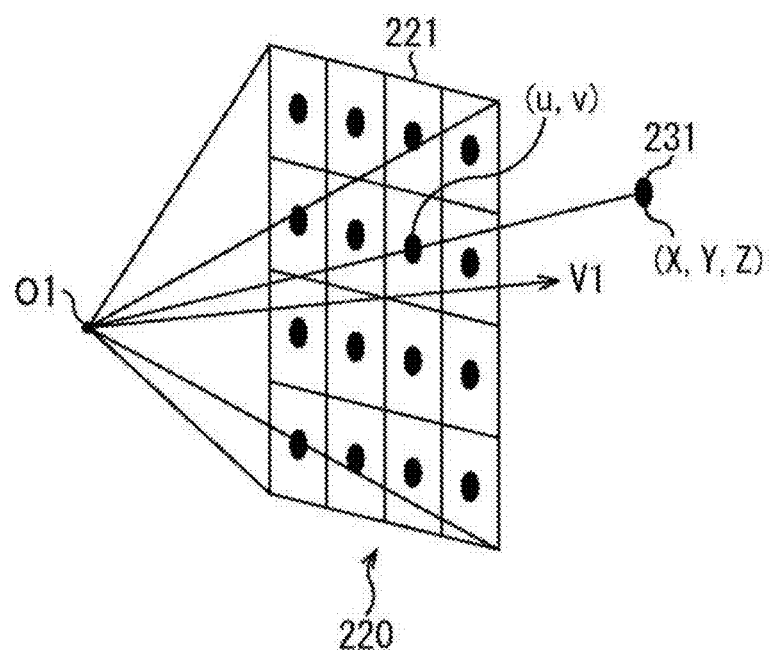
FIG. 19 is a view illustrating a first reconstruction method.

FIG. 19 is a view illustrating a first reconstruction method.

Note that it is assumed that, in the example of FIG. 19, the resolution of texture images and depth images of two viewpoints is 4 (horizontal)×4 (vertical) pixels for the convenience of description. Further, FIG. 19 illustrates a case in which a three-dimensional structure of a main imaging object is reconstructed using a texture image and a depth image of one viewpoint O1 of the two viewpoints.

The first reconstruction method is a method of reconstructing a three-dimensional structure using a point cloud. In particular, as depicted in FIG. 19, according to the first reconstruction method, the reconstruction section 205 generates, on the basis of a viewpoint O1, a sight line direction V1, a field angle 2θ, a position (u, v) of a sampling point 231, which corresponds to each pixel 221 of a texture image 220 of the viewpoint O1, on the texture image 220, and a pixel value of each pixel 221 of a depth image corresponding to the texture image 220, three-dimensional coordinates (X, Y, Z) of the sampling point 231 in a 3D model coordinate system.

Further, the reconstruction section 205 converts YCbCr values that are a pixel value of each pixel 221 of the texture image 220 into RGB values and determines them as RGB values of the sampling point 231 corresponding to the pixel 221. The reconstruction section 205 draws points of the RGB values of the sampling points 231 to the three-dimensional coordinate values (X, Y, Z) of the sampling points 231 to reconstruct a three-dimensional structure of the main imaging object. The reconstruction section 205 supplies the three-dimensional coordinates (X, Y, Z) of the sampling points 231 as position information of the three-dimensional structures of the main imaging objects to the drawing section 206 and supplies the RGB values of the sampling points 231 as color information of the three-dimensional structures of the main imaging objects to the drawing section 206.

(Description of Second Reconstruction Method)

Figure 20:
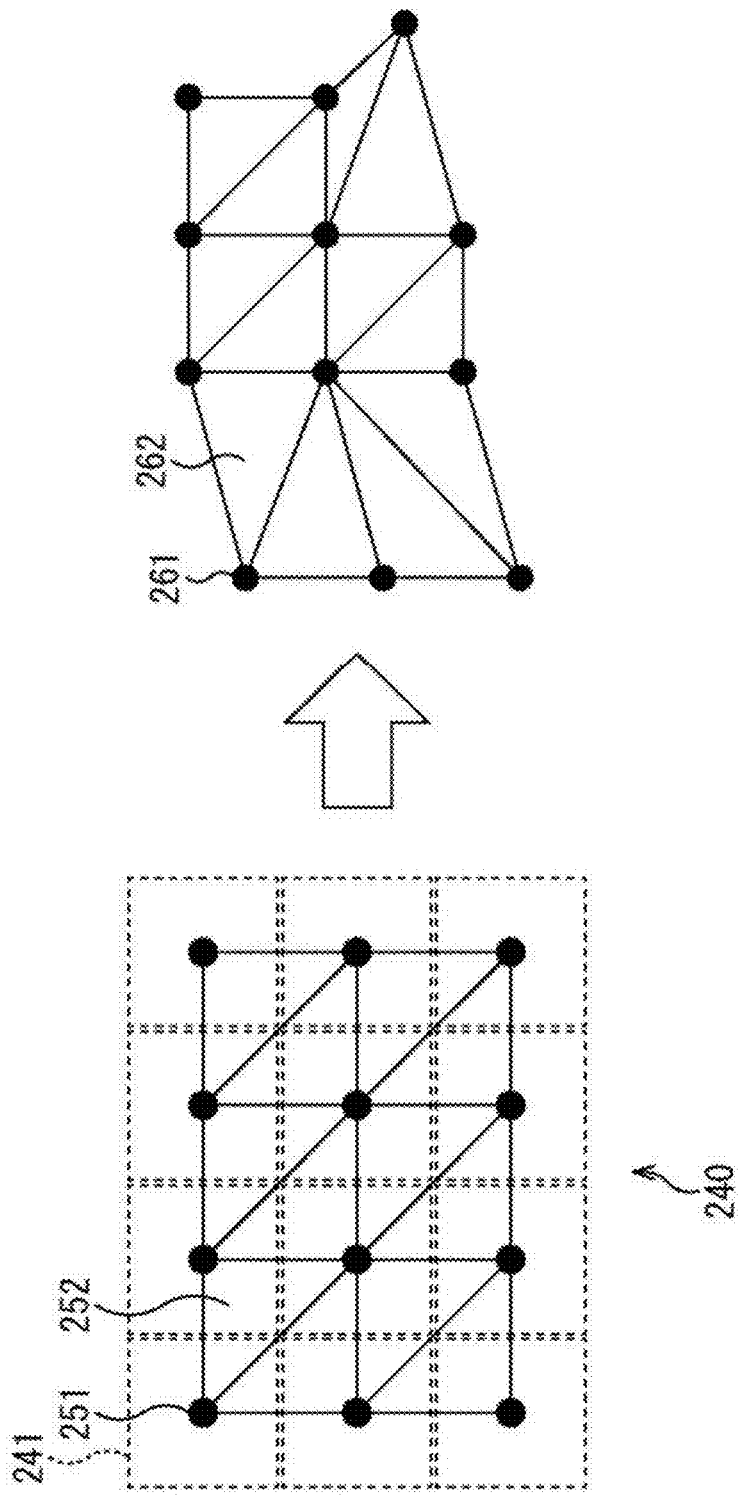
FIG. 20 is a view illustrating a second reconstruction method.

FIG. 20 is a view illustrating a second reconstruction method.

Note that it is assumed that, in the example of FIG. 20, the resolution of texture images and depth images of two viewpoints is 4 (horizontal)×3 (vertical) pixels for the convenience of description. Further, FIG. 20 depicts a case in which a three-dimensional structure of a main imaging object is reconstructed using a texture image and a depth image of one viewpoint O1 of two viewpoints.

The second reconstruction method is a method of reconstructing a three-dimensional structure using a triangle patch. In particular, as depicted on the left side in FIG. 20, in the second reconstruction method, the reconstruction section 205 generates sampling points 251 corresponding to pixels 241 on a texture image 240 of the viewpoint O1. The reconstruction section 205 connects three neighboring sampling points 251 from among the sampling points 251 corresponding to all pixels of the texture image 240 to generate triangle patches 252 having vertices at the three neighboring sampling points 251.

Then, the reconstruction section 205 generates, on the basis of the viewpoint O1, a sight line direction V1, a field angle 2θ, a position (u, v) of each sampling point 251 on the texture image 240, and a pixel value of each pixel 241 of a depth image corresponding to the texture image 240, three-dimensional coordinates (X, Y, Z) of the sampling point 251 in a 3D model coordinate system.

Then, the reconstruction section 205 arranges, as depicted on the right side in FIG. 20, sampling points 261 corresponding to the sampling points 251 in the 3D model coordinate system on the basis of the three-dimensional coordinates (X, Y, Z) of the sampling points 251. Further, the reconstruction section 205 connects sampling points 261 corresponding to three sampling points 251 configuring the vertices of the triangle patches 252 to generate triangle patches 262.

Further, the reconstruction section 205 converts, for each triangle patch 262, YCbCr values of the pixels 241 configuring the triangle patch 252 corresponding to the triangle patch 262 into RGB values and uses the RGB values to generate RGB values of the triangle patch 262. The reconstruction section 205 pastes, for each triangle patch 262, a texture of RGB values of the triangle patch 262 to the triangle patch 262. The reconstruction section 205 thereby reconstructs a three-dimensional structure of a main imaging object. The reconstruction section 205 supplies the three-dimensional coordinates (X, Y, Z) of the sampling points 261 that are vertices of the triangle patches 262 as positional information of the three-dimensional structures of a main imaging object to the drawing section 206. Further, the reconstruction section 205 supplies the RGB values of the triangle patches 262 as color information of the three-dimensional structures of the main imaging object to the drawing section 206.

While methods for reconstructing a three-dimensional structure of a main imaging object from a texture image and a depth image of the viewpoint O1 are described with reference to FIGS. 19 and 20, also a method for reconstructing a three-dimensional structure of a main imaging object from a texture image and a depth image of the viewpoint O2 and a method for reconstructing a three-dimensional structure of a background region from a texture image and a depth image of an omnidirectional image are similar to those just described.

(Description of Processing of Display Apparatus)

Figure 21:
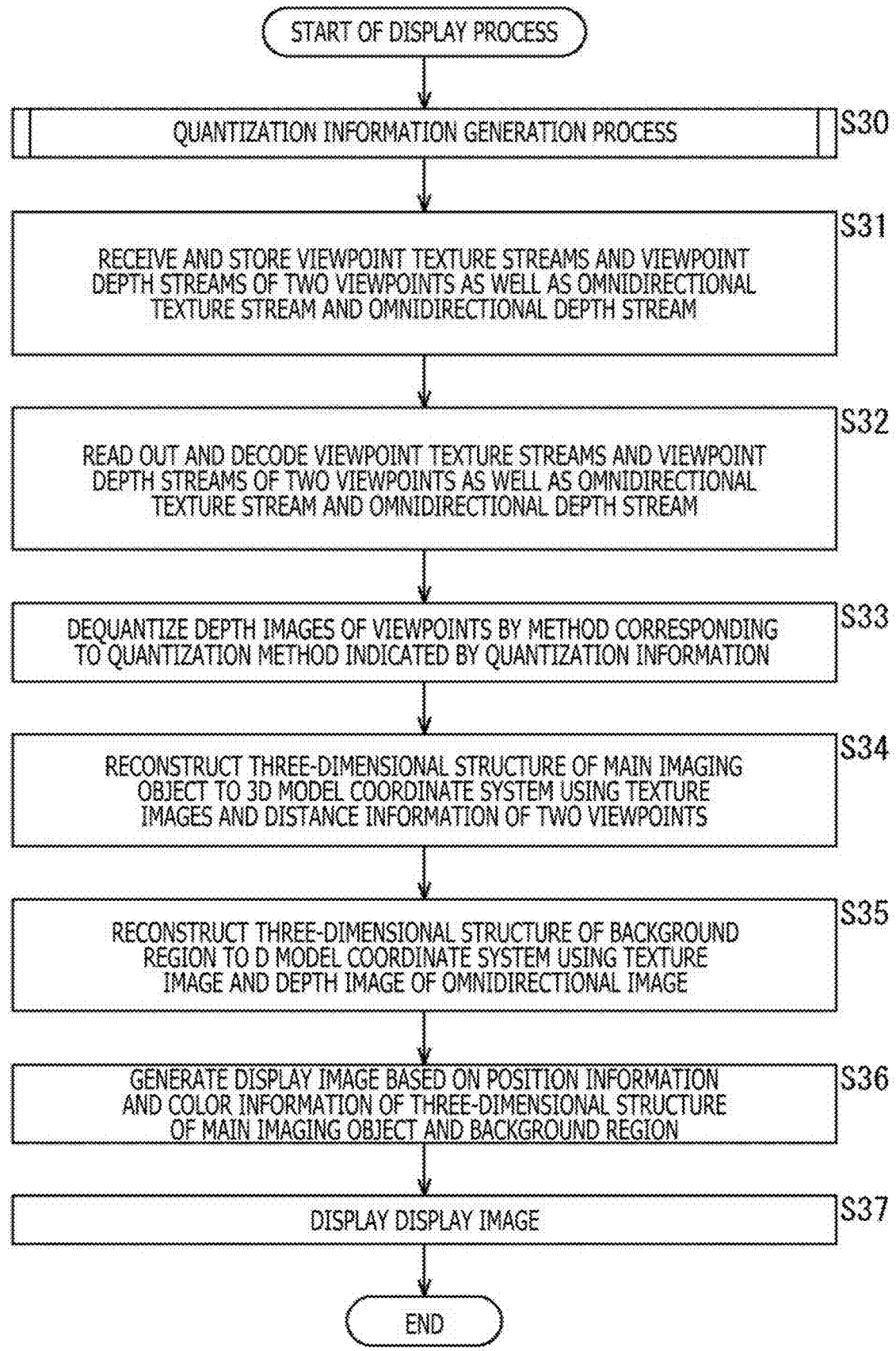
FIG. 21 is a flow chart illustrating a displaying process.

FIG. 21 is a flow chart illustrating a display process of the display apparatus 200 of FIG. 14. This display process is started, for example, when a request to display a display image is issued from a viewer.

At step S30 of FIG. 21, the selection section 208 of the display apparatus 200 performs a quantization information generation process for generating and transmitting quantization information. Details of the quantization information generation process are hereinafter described with reference to FIG. 22.

At step S31, the reception section 201 receives viewpoint texture streams and viewpoint depth streams of two viewpoints and an omnidirectional texture stream and an omnidirectional depth stream which are transmitted from the generation apparatus 12 of FIG. 1 in response to the quantization information and supplies them to the storage section 202 to be stored.

At step S32, the decoder 203 reads out the viewpoint texture streams and viewpoint depth streams of two viewpoints and the omnidirectional texture stream and omnidirectional depth stream from the storage section 202 and decodes them. The decoder 203 supplies texture images and depth images of two viewpoints and a texture image and a depth image of an omnidirectional image obtained as a result of the decoding to the reconstruction section 205. Further, the decoder 203 supplies the depth images of two viewpoints obtained as a result of the decoding to the dequantization section 204.

At step S33, the dequantization section 204 dequantizes, for each viewpoint, the depth images supplied from the decoder 203 by a dequantization method corresponding to the quantization method indicated by the quantization information supplied from the selection section 208 to generate distance information of each of the pixels. The dequantization section 204 supplies the distance information of each of the pixels of the depth images of each viewpoint to the reconstruction section 205.

At step S34, the reconstruction section 205 uses the distance information of the pixels of the texture images and the depth images of two viewpoints to reconstruct a three-dimensional structure of a main imaging object in the 3D model coordinate system. The reconstruction section 205 supplies the position information and the color information of the three-dimensional structure of the main imaging object to the drawing section 206.

At step S35, the reconstruction section 205 uses the texture image and the depth image of an omnidirectional image supplied from the decoder 203 to reconstruct a three-dimensional structure of the background region in the 3D model coordinate system. The reconstruction section 205 supplies the position information and the color information of the three-dimensional structure of the background region to the drawing section 206.

At step S36, the drawing section 206 generates, on the basis of the position information and the color information of the three-dimensional structures of the main imaging object and the background region supplied from the reconstruction section 205, a texture image having the viewpoint, sight line direction, and field angle in the 3D model coordinate system designated by the viewer or the like as a display image. The drawing section 206 supplies the generated display image to the display section 207.

At step S37, the display section 207 displays the display image supplied from the drawing section 206 and ends the processing.

Figure 22:
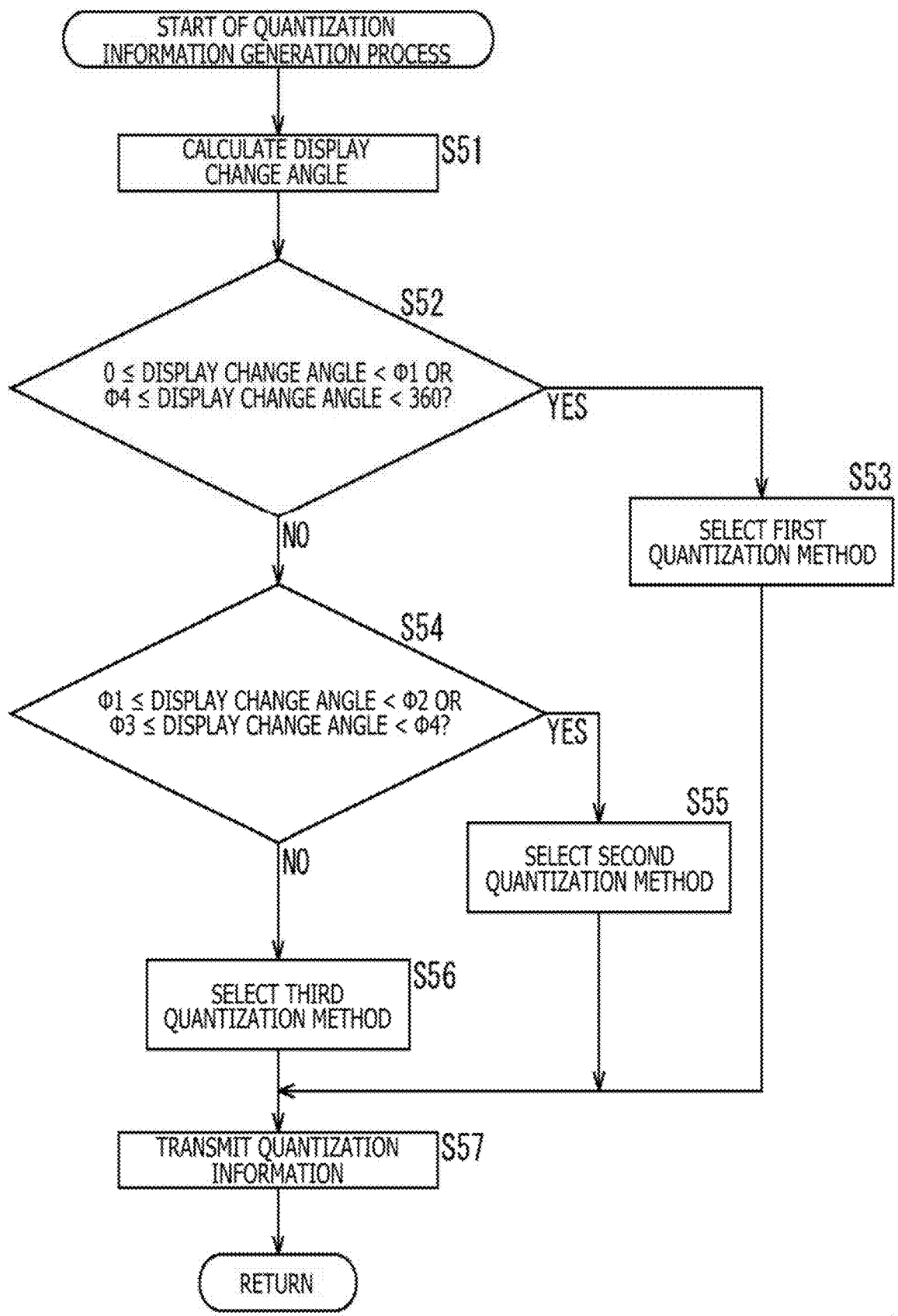
FIG. 22 is a flow chart illustrating a quantization information generation process.

FIG. 22 is a flow chart illustrating the quantization information generation process at step S30 of FIG. 21. This quantization information generation process is performed for each viewpoint.

At step S51 of FIG. 22, the selection section 208 calculates a display change angle on the basis of a viewpoint and a sight line direction in the 3D model coordinate system designated by the viewer or the like.

At step S52, the selection section 208 decides whether the display change angle is equal to or greater than 0 degrees but smaller than $\varphi 1$ degrees or is equal to or greater than $\varphi 4$ degrees but smaller than 360 degrees. In a case where it is decided at step S52 that the display change angle is equal to or greater than 0 degrees but smaller than $\varphi 1$ degrees or is equal to or greater than $\varphi 4$ degrees but smaller than 360 degrees, the processing advances to step S53.

At step S53, the selection section 208 selects the first quantization method and generates and supplies quantization information of the first quantization method to the transmission section 209. Then, the processing advances to step S57.

On the other hand, in a case where it is decided at step S52 that the display change angle is not equal to or greater than 0 degrees but smaller than $\varphi 1$ degrees or is not equal to or greater than $\varphi 4$ degrees but smaller than 360 degrees, the processing advances to step S54.

At step S54, the selection section 208 decides whether the display change angle is equal to or greater than $\varphi 1$ degrees but smaller than $\varphi 2$ degrees or is equal to or greater than $\varphi 3$ degrees but smaller than $\varphi 4$ degrees. In a case where it is decided at step S54 that the display change angle is equal to or greater than $\varphi 1$ degrees but smaller than $\varphi 2$ degrees or is equal to or greater than $\varphi 3$ degrees but smaller than $\varphi 4$ degrees, the processing advances to step S55.

At step S55, the selection section 208 selects the second quantization method and generates and supplies quantization information of the second quantization method to the transmission section 209. Then, the processing advances to step S57.

On the other hand, in a case where it is decided at step S54 that the display change angle is not equal to or greater than $\varphi 1$ degrees but smaller than $\varphi 2$ degrees or is not equal to or greater than $\varphi 3$ degrees but smaller than $\varphi 4$ degrees, namely, in a case where the display change angle is equal to or greater than $\varphi 2$ degrees but smaller than $\varphi 3$ degrees, the processing advances to step S56.

At step S56, the selection section 208 selects the third quantization method and generates and supplies quantization information of the third quantization method to the transmission section 209. Then, the processing advances to step S57.

At step S57, the transmission section 209 transmits the quantization information supplied from the selection section 208 to the generation apparatus 12 of FIG. 1. Then, the processing returns to step S30 of FIG. 21 and then advances to step S31.

In this manner, the display apparatus 200 generates a display image using texture images and depth images of two viewpoints generated by the generation apparatus 12. Accordingly, in comparison with an alternative case in which texture images and depth images of two viewpoints generated by perspectively projecting a front face of a polygon for each of the two viewpoints, it is possible to reconstruct a three-dimensional structure of a main imaging object in a greater number of regions and generate a display image from the three-dimensional structures. As a result, the picture quality of the display image is enhanced.

Further, the display apparatus 200 selects a quantization method for a depth image of each viewpoint from among the first to third quantization methods. Accordingly, the display apparatus 200 can generate a display image using a depth image generated by a quantization method suitable for generation of a display image, for example, from among the first to third quantization methods. As a result, the picture quality of the display image is enhanced.

Different Example of Texture Image

Figure 23A:
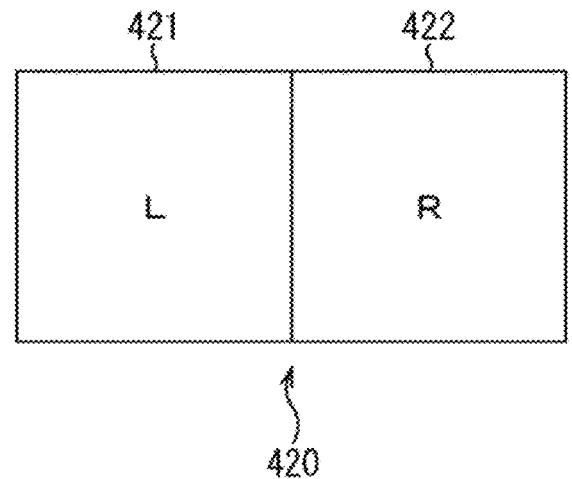
FIGS. 23A and 23B are views depicting a different example of a texture image.
Figure 23B:
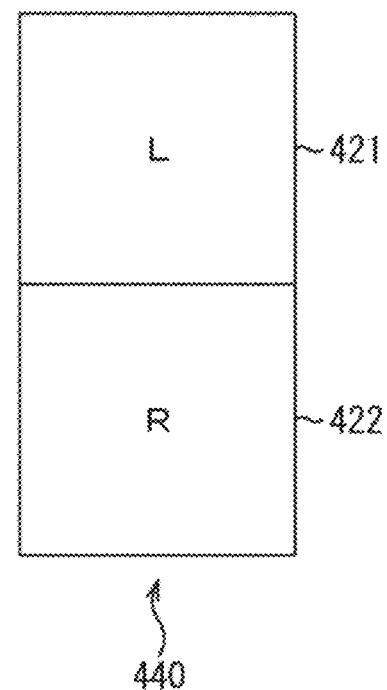

FIGS. 23A and 23B are views depicting a different example of a texture image.

Although, in the foregoing description, the texture image is a texture image of one viewpoint, it may be a composite of texture images of a viewpoint for the left eye and a viewpoint for the right eye corresponding to the viewpoint.

In particular, as depicted in FIG. 23A, the texture image may be, for example, a packed image 420 in which a texture image 421 of a viewpoint for the left eye and another texture image 422 of a viewpoint for the right eye that correspond to one viewpoint are packed in a transverse direction (horizontal direction).

Alternatively, as depicted in FIG. 23B, the texture image may be, for example, a packed image 440 in which a texture image 421 and another texture image 422 are packed in a longitudinal direction (vertical direction).

In a case where the texture image is a texture image in which images of a viewpoint for the left eye and a viewpoint for the right eye are packed, the texture image obtained as a result of decoding is separated into the texture image of the viewpoint for the left eye and the texture image of the viewpoint for the right eye. Then, a three-dimensional structure is generated for each eye.

Then, a display image for the left eye is generated from the three-dimensional structure for the left eye on the basis of the viewpoint of the left eye corresponding to the viewpoint designated by the viewer or the like, the sight line direction, and the field angle. Meanwhile, a display image for the right eye is generated from the three-dimensional structure for the right eye on the basis of the viewpoint of the right eye corresponding to the viewpoint designated by the viewer or the like, the sight line direction, and the field angle.

In the case where the display section 207 is 3D displayable, the display section 207 displays a display image for the left eye as an image for the left eye and displays a display image for the right eye as an image for the right eye to 3D display a display image. On the other hand, in the case where the display section 207 is not 3D displayable, the display section 207 2D displays the display image for the left eye or the display image for the right eye.

It is to be noted that, while the number of viewpoints is two in the first embodiment, the number of viewpoints is not limited to two. Further, the two viewpoints may not be opposed to each other. The sight line direction may be a direction from the viewpoint to a position other than the origin.

Further, the display apparatus 200 may not transmit quantization information to the generation apparatus 12 but may receive viewpoint depth streams of the first to third quantization methods from the generation apparatus 12 and store them into the storage section 202. In this case, the display apparatus 200 reads out, on the basis of the quantization information, only a viewpoint depth stream of the quantization method indicated by the quantization information from among the viewpoint depth streams of the first to third quantization methods stored in the storage section 202 and decodes the viewpoint depth stream.

Further, while the display apparatus 200 in the foregoing description selects a quantization method on the basis of a display change angle, in a case where the processing load on the display apparatus 200 is to be suppressed, the second quantization method may be selected irrespective of the display change angle. Further, selection of a quantization method may be performed on the basis of information other than the display change angle. For example, a quantization method may be selected on the basis of presence or absence of movement of a main imaging object.

Further, in the first and second quantization methods, the distance in the depth direction of a polygon between a viewpoint and each pixel may be used in place of the distance r while, in the third quantization method, the distance in the depth direction of a polygon at each pixel between a viewpoint and the other viewpoint configuring the two viewpoints may be used in place of the distance r'.

Second Embodiment

The configuration of a second embodiment of a distribution system to which the present disclosure is applied is same as the configuration described above, for example, of the generation apparatus 12 of FIG. 1 or the display apparatus 200 depicted in FIG. 14 except that tan axis projection (details are hereinafter described) is performed in place of perspective projection. Accordingly, in the following, description is given only of tan axis projection.

(Description of Coordinate System of Projection Face)

Figure 24:
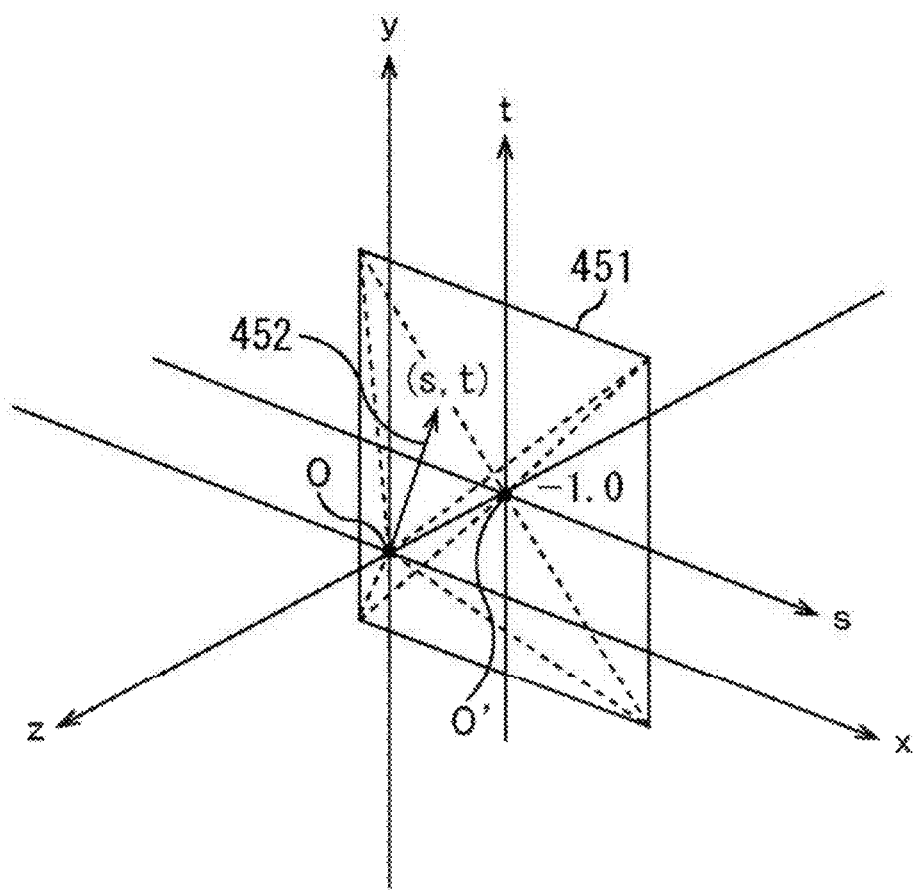
FIG. 24 is a view illustrating a coordinate system of a projection face.

FIG. 24 is a view illustrating a coordinate system of a projection face.

It is to be noted that, in the third embodiment, the projection face is a two-dimensional plane to which, when the generation apparatus 12 generates a high resolution image, an omnidirectional image mapped to a sphere is tan axis projected or a viewing range in which, when the display apparatus 200 generates a display image, a 3D model image is tan axis projected.

In the example of FIG. 24, a projection face 451 whose z is −1.0 is set in a three-dimensional xyz coordinate system of a 3D model. In this case, a two-dimensional st coordinate system in which the center O' of the projection face 451 is the origin and the horizontal direction of the projection face 451 is an s direction while the vertical direction is a t direction is a coordinate system of the projection face 451.

It is to be noted that, in the following description, a vector 452 heading from the origin O of the xyz coordinate system to coordinates (s, t) of the st coordinate system is referred to as vector (s, t, −1.0) using the coordinates (s, t) and −1.0 that is the distance from the origin O to the projection face 451.

(Description of Tan Axis Projection)

Figure 25:
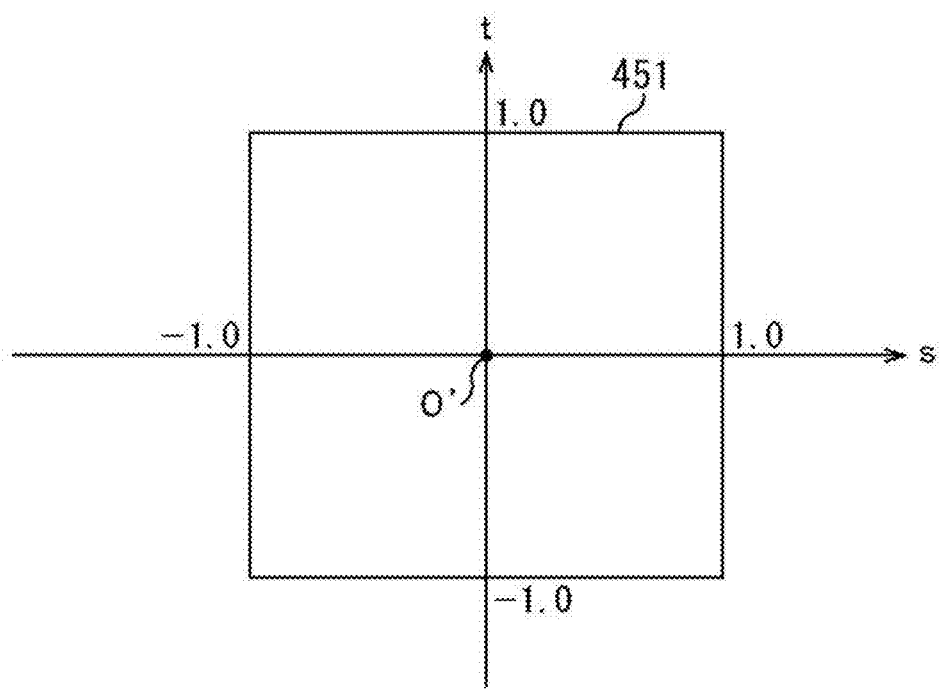
FIG. 25 is a view illustrating tan axis projection.

FIG. 25 is a view illustrating tan axis projection (tangential axis projection).

FIG. 25 is a view of the projection face 451 as viewed in the negative direction of z. In the example of FIG. 25, in the st coordinate system, the minimum values of the s value and the t value of the projection face 451 are −1.0, and the maximum values are 1.0.

In this case, in perspective projection, a projection point is set on the projection face 451 such that the projection vector heading from the origin O to the projection point on the projection face 451 becomes a vector (s', t', −1.0). It is to be noted that s' indicates a value at each of predetermined distances provided within a range of the s value from −1.0 to 1.0, and t' indicates a value at each of predetermined distances provided within a range of the t value from −1.0 to 1.0. Accordingly, projection points in perspective projection are uniform on the projection face 451.

In contrast, if the field angle of the projection face 451 is θw (in the example of FIG. 25, π/2), then in tan axis projection, a projection point is set on the projection face 451 such that the projection vector is a vector $(\tan(s'*\theta w/2), \tan(t'*\theta w/2), -1.0)$.

In particular, if s'*θw/2 is represented by θ and t'*θw/2 is represented by φ, then the vector (tan(s'*θw/2), tan(t'*θw/2), −1.0) becomes a vector (tan θ, tan φ, −1.0). At this time, if the field angle θw comes close to n, then tan θ and tamp diverge to infinity. Accordingly, the vector (tan θ, tam φ, −1.0) is corrected to a vector (sin θ*cos φ, cos θ*sin φ, −cos θ*cos φ) such that tan θ and tan φ do not diverge to infinity, and a projection point is set on the projection face 451 such that the projection vector becomes the vector (sin θ*cos φ, cos θ*sin φ, −cos θ*cos φ). Accordingly, in tan axis projection, angles defined by every projection vectors corresponding to projection points neighboring with each other become equal.

It is to be noted that, similarly to a logarithmic axis (log scale), tan(s'*θw/2) and tan(t'*θw/2) are grasped as s' and t' of the tan axis. Accordingly, in the present specification, projection where the projection vector is the vector (tan (s'*θw/2), tan(t'*θw/2), −1.0) is referred to as tan axis projection.

Third Embodiment (Description of Computer to which Present Disclosure is Applied)

While the series of processes described above can be executed by hardware, it may otherwise be executed by software. In a case where the series of processes is executed by software, a program that constitutes the software is installed into a computer. Here, the computer includes a computer incorporated in hardware for exclusive use, for example, a personal computer for universal use that can execute various functions by installing various programs, and the like.

Figure 26:
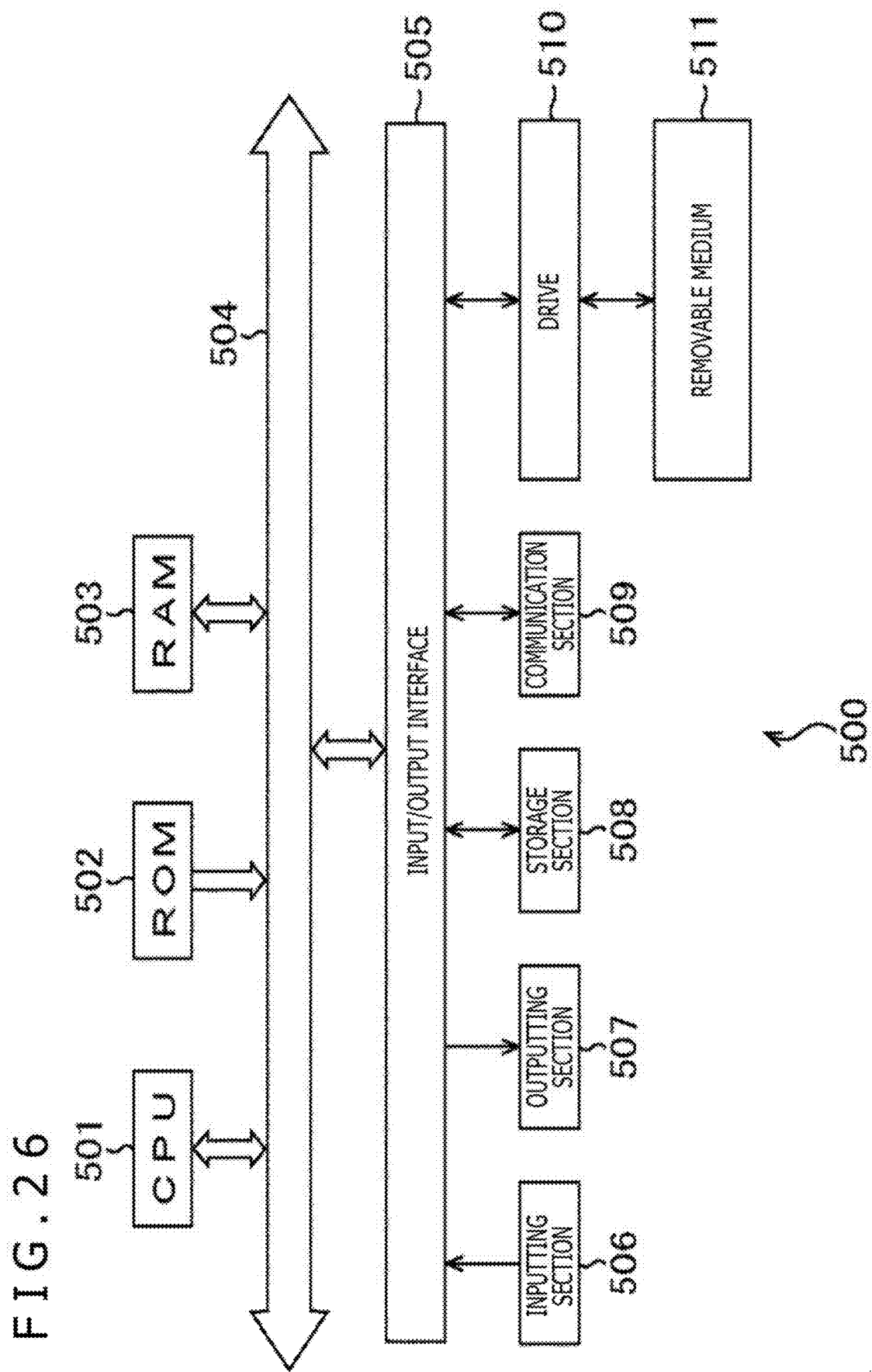
FIG. 26 is a block diagram depicting a configuration example of hardware of a computer.

FIG. 26 is a block diagram depicting a configuration example of hardware of a computer that executes the series of processes described hereinabove in accordance with a program.

In the computer 500, a CPU (Central Processing Unit) 501, a ROM (Read Only Memory) 502, and a RAM (Random Access Memory) 503 are connected to each other by a bus 504.

To the bus 504, an input/output interface 505 is connected further. To the input/output interface 505, an inputting section 506, an outputting section 507, a storage section 508, a communication section 509, and a drive 510 are connected.

The inputting section 506 includes a keyboard, a mouse, a microphone, and the like. The outputting section 507 includes a display, a speaker, and the like. The storage section 508 includes a hard disk, a nonvolatile memory, and the like. The communication section 509 includes a network interface or the like. The drive 510 drives a removable medium 511 such as a magnetic disk, an optical disk, a magneto-optical disk, a semiconductor memory, or the like.

In the computer 500 configured in such a manner as described above, the CPU 501 loads a program stored, for example, in the storage section 508 into the RAM 503 through the input/output interface 505 and the bus 504 to perform the series of processes described above.

The program that is executed by the computer 500 (CPU 501) can be recorded into and provided as the removable medium 511, for example, as a package medium or the like. Further, the program can be provided through a wired or wireless transmission medium such as a local area network, the Internet, a digital satellite broadcast, or the like.

In the computer 500, a program can be installed into the storage section 508 through the input/output interface 505 by mounting a removable medium 511 on the drive 510. Further, the program can be received by the communication section 509 through a wired or wireless transmission medium and installed into the storage section 508. Further, the program can be installed in advance into the ROM 502 or the storage section 508.

It is to be noted that the program executed by the computer 500 may be a program in which processes are performed in time series in accordance with the order described in the present specification or may be a program in which processes are executed in parallel or at a necessary timing such as, for example, when the program is called, or the like.

Application Example

The technology according to the present disclosure can be applied to various products. For example, the technology according to the present disclosure may be implemented as an apparatus that is incorporated in various types of mobile bodies such as automobiles, electric cars, hybrid electric cars, motorcycles, bicycles, personal mobilities, airplanes, drones, ships, robots, construction machines, agricultural machines (tractors), and the like.

FIG. 27 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 27, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 27 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 28 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 28 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 27, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 27, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 27 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

It is to be noted that a computer program for implementing the functions of the generation apparatus 12 and the display apparatus 200 according to the present embodiments described hereinabove with reference to FIGS. 1, 2, 3, 4, 5A, 5B, 5C, 6A, 6B, 7, 8, 9, 10A, 10B, 10C, 11A, 11B, 12A, 12B, 13, 14, 15, 16, 17, 18, 19, 20, 21, 22, 23A, 23B, 24, and 25 can be incorporated into some control unit or the like. Further, also it is possible to provide a computer-readable recording medium in which such a computer program as just described is stored. The recording medium may be, for example, a magnetic disk, an optical disk, a magneto-optical disk, a flash memory, or the like. Further, the computer program described above may be distributed, for example, through a network without using a recording medium.

In the vehicle control system 7000 described above, the generation apparatus 12 and the display apparatus 200 according to the present embodiments described hereinabove with reference to FIGS. 1, 2, 3, 4, 5A, 5B, 5C, 6A, 6B, 7, 8, 9, 10A, 10B, 10C, 11A, 11B, 12A, 12B, 13, 14, 15, 16, 17, 18, 19, 20, 21, 22, 23A, 23B, 24, and 25 can be applied. In this case, for example, the generation apparatus 12 and the display apparatus 200 are integrated and correspond to the microcomputer 7610, the storage section 7690, and the display section 7720. Further, the imaging apparatus 11 corresponds to the imaging section 7410. In this case, for example, the vehicle control system 7000 can represent a three-dimensional structure of a greater number of regions using texture images and depth images of two viewpoints.

Further, at least part of the components of the generation apparatus 12 and the display apparatus 200 described hereinabove with reference to FIGS. 1, 2, 3, 4, 5A, 5B, 5C, 6A, 6B, 7, 8, 9, 10A, 10B, 10C, 11A, 11B, 12A, 12B, 13, 14, 15, 16, 17, 18, 19, 20, 21, 22, 23A, 23B, 24, and 25 may be implemented by a module for the vehicle control system 7000 depicted in FIG. 27 (for example, by an integrated circuit module configured by one die). As an alternative, the generation apparatus 12 and the display apparatus 200 described with reference to FIGS. 1, 2, 3, 4, 5A, 5B, 5C, 6A, 6B, 7, 8, 9, 10A, 10B, 10C, 11A, 11B, 12A, 12B, 13, 14, 15, 16, 17, 18, 19, 20, 21, 22, 23A, 23B, 24, and 25 may be implemented by a plurality of control units of the vehicle control system 7000 depicted in FIG. 27.

It is to be noted that the advantageous effects described herein are illustrative only and are not restrictive, and other advantages may be available.

Further, the embodiment of the present disclosure is not limited to the embodiments described hereinabove, and various alterations are possible without departing from the subject matter of the present disclosure.

For example, the present disclosure can assume a configuration for cloud computing in which one function is shared by a plurality of apparatuses through a network and processed in collaboration.

Further, the steps described hereinabove in connection with the flow charts can be executed by a single apparatus or can be executed by sharing by a plurality of apparatuses.

Furthermore, in a case where one step includes a plurality of processes, the plurality of processes included in the one step can be executed by a single apparatus and also can be executed by sharing by a plurality of apparatuses.

It is to be noted that the present disclosure can assume such a configuration as described below.

(1)

An image processing apparatus, including:

an image generation section configured to generate a texture image of a predetermined viewpoint using a texture image obtained by projecting, to a projection face perpendicular to a sight line direction heading from each of two viewpoints which are opposed to each other across the center of a polygon, toward a center of the polygon, a rear face of the polygon and a depth image corresponding to the texture image of each of the viewpoints; and a quantization section configured to quantize a reciprocal of a distance between the other viewpoint that configures the two viewpoints together with the viewpoint corresponding to the depth image and the polygon in each pixel.

(2)

The image processing apparatus according to (1) above, in which the quantization section includes a quantization method in addition to a quantization method for quantizing a reciprocal of a distance between the other viewpoint that configures the two viewpoints together with the viewpoint corresponding to the depth image and the polygon in each pixel and changes over the quantization method based on a predetermined condition.

(3)

The image processing apparatus according to (1) above, in which the quantization section includes, as the quantization method of the depth image for each viewpoint, a first quantization method that quantizes a reciprocal of a distance between a viewpoint corresponding to the depth image and the polygon for each pixel, a second quantization method that quantizes the distance, and a third quantization method that quantizes a reciprocal of a distance between the other viewpoint that configures the two viewpoints together with the viewpoint corresponding to the depth image and the polygon in each pixel.

(4)

The image processing apparatus according to (3) above, in which the distance corresponding to the first and second quantization methods is a distance of a straight line interconnecting the viewpoint corresponding to the depth image and the polygon in each pixel, and the distance corresponding to the third quantization method is a distance of a straight line interconnecting the other viewpoint and the polygon in each pixel.

(5)

The image processing apparatus according to (3) or (4), in which the quantization section selects, for each of the viewpoints, a quantization method for the depth image on a basis of an angle defined by a depth direction of a texture image of the predetermined viewpoint and a depth direction of a texture image of the given viewpoint.

(6)

The image processing apparatus according to (5) above, in which the quantization section selects, in a case where the angle is equal to or greater than 0 degrees but smaller than a first threshold value or is equal to or greater than a second threshold value but smaller than 360 degrees, the first quantization method as the quantization method for the depth image, the first threshold value is smaller than 90 degrees, and the second threshold value is greater than 270 degrees.

(7)

The image processing apparatus according to (6) above, in which the quantization section selects, in a case where the angle is equal to or greater than the first threshold value but smaller than a third threshold value or is equal to or greater than a fourth threshold value but smaller than the second threshold value, the second quantization method as the quantization method for the depth image, the third threshold value is greater than 90 degrees but smaller than 180 degrees, and the fourth threshold value is greater than 180 degrees but smaller than 270 degrees.

(8)

The image processing apparatus according to (7) above, in which the quantization section selects the third quantization method as the quantization method for the depth image in a case where the angle is equal to or greater than the third threshold value but smaller than the fourth threshold value.

(9)

The image processing apparatus according to any of (1) to (8) above, in which the polygon is generated using picked up images acquired by a plurality of imaging apparatuses, which are disposed around an imaging object corresponding to the polygon and include at least part of the imaging object in an imaging range thereof, and depth images corresponding to the picked up images.

(10)

The image processing apparatus according to (9) above, in which the image generation section generates the texture image of the predetermined viewpoint using a texture image of an omnidirectional image generated using the picked up images acquired by the plurality of image pickup apparatuses and a depth image of the omnidirectional image generated using depth images corresponding to the picked up images acquired by the plurality of imaging apparatuses.

(11)

An image processing method executed by an image processing apparatus, including:

an image generation step of generating a texture image of a predetermined viewpoint using a texture image obtained by projecting, to a projection face perpendicular to a sight line direction heading from each of two viewpoints, which are opposed to each other across the center of a polygon, toward a center of the polygon, a rear face of the polygon and a depth image corresponding to the texture image of each of the viewpoints; and a quantization step of quantizing a reciprocal of a distance between the other viewpoint that configures the two viewpoints together with the viewpoint corresponding to the depth image and the polygon in each pixel.

(12)

An image processing apparatus, including:

a texture image generation section configured to project, to a projection face perpendicular to a sight line direction heading from each of two viewpoints, which are opposed to each other across the center of a polygon, toward a center of the polygon, a rear face of the polygon to generate a texture image; and a depth image generation section configured to generate a depth image that corresponds to the texture image of each of the viewpoints by setting a quantization value obtained by a quantization method for quantizing a reciprocal of a distance between the other viewpoint that configures the two viewpoints together with the viewpoint corresponding to the depth image and the polygon in each pixel as a pixel value.

(13)

The image processing apparatus according to (12) above, in which the depth image generation section includes a quantization method in addition to a quantization method for quantizing a reciprocal of a distance between the other viewpoint that configures the two viewpoints together with the viewpoint corresponding to the depth image and the polygon in each pixel and changes over the quantization method on a basis of a predetermined condition.

(14)

The image processing apparatus according to (12) above, in which the depth image generation section includes, as the quantization method of the depth image for each viewpoint, a first quantization method that quantizes a reciprocal of a distance between a viewpoint corresponding to the depth image and the polygon for each pixel, a second quantization method that quantizes the distance, and a third quantization method that quantizes a reciprocal of a distance between the other viewpoint that configures the two viewpoints together with the viewpoint corresponding to the depth image and the polygon in each pixel.

(15)

The image processing apparatus according to (14) above, in which the distance corresponding to the first and second quantization methods is a distance of a straight line interconnecting the viewpoint corresponding to the depth image and the polygon in each pixel, and the distance corresponding to the third quantization method is a distance of a straight line interconnecting the other viewpoint and the polygon in each pixel.

(16)

The image processing apparatus according to (14) or (15) above, further including:

a transmission section configured to transmit the texture images of the two viewpoints generated by the texture image generation section and the depth images of the two viewpoints generated by the depth image generation section.

(17)

The image processing apparatus according to (16) above, in which the depth image generation section generates the depth images of the two viewpoints by each of the first to third quantization methods, and the transmission section transmits the depth images of the two viewpoints generated by one of the first to third quantization methods by the depth image generation section.

(18)

The image processing apparatus according to any of (12) to (17) above, further including:

a polygon generation section configured to generate the polygon using picked up images acquired by a plurality of imaging apparatuses which are disposed around an imaging object corresponding to the polygon and include at least part of the imaging object in an imaging range thereof, and depth images corresponding to the picked up images.

(19)

The image processing apparatus according to (18) above, further including:

an omnidirectional image generation section configured to generate a texture image of an omnidirectional image generated using the picked up images acquired by the plurality of image pickup apparatuses and generate a depth image of the omnidirectional image using depth images corresponding to the picked up images acquired by the plurality of imaging apparatuses.

(20)

An image processing method executed by an image processing apparatus, including:

a texture image generation step of projecting, to a projection face perpendicular to a sight line direction heading from each of two viewpoints, which are opposed to each other across the center of a polygon, toward a center of the polygon, a rear face of the polygon to generate a texture image; and a depth image generation step of generating a depth image that corresponds to the texture image of each of the viewpoints by setting a quantization value obtained by a quantization method for quantizing a reciprocal of a distance between the other viewpoint that configures the two viewpoints together with the viewpoint corresponding to the depth image and the polygon in each pixel as a pixel value.

REFERENCE SIGNS LIST 11-1 to 11-N imaging apparatus, 12 generation apparatus, 34 polygon generation section, 36 omnidirectional image generation section, 40 transmission section, 61 imaging object, 71 texture image generation section, 74 1/r quantization section, 75 equal distance quantization section, 76 reciprocal 1/r quantization section, 81 sphere, 200 display apparatus, 206 drawing section, 208 selection section

The invention claimed is:

1. An image processing apparatus, comprising:
a central processing unit (CPU) configured to:
generate a first texture image of a specific viewpoint, based on each of a second texture image of a first viewpoint, a third texture image of a second viewpoint, a first depth image corresponding to the second texture image, and a second depth image corresponding to the third texture image, wherein
the second texture image is obtained based on projection of a first rear face of a polygon to a first projection face with respect to the first viewpoint,
the third texture image is obtained based on projection of a second rear face of the polygon to a second projection face with respect to the second viewpoint,
the first projection face is perpendicular to a first sight line direction,
the second projection face is perpendicular to a second sight line direction,
the first sight line direction is from the first viewpoint to a center of the polygon,
the second sight line direction is from the second viewpoint to the center of the polygon,
the first viewpoint and the second viewpoint are opposed to each other across the center of the polygon,
the second texture image corresponds to a first reconstructed portion of the polygon,
the third texture image corresponds to a second reconstructed portion of the polygon, and
each of the first reconstructed portion of the polygon and the second reconstructed portion of the polygon is greater than one-half of the polygon; and
quantize a reciprocal of a first distance between the first viewpoint and the polygon at each pixel of the second texture image.

2. The image processing apparatus according to claim 1, wherein the CPU is further configured to:
quantize, by a first quantization method, the reciprocal of the first distance between the first viewpoint and the polygon at each pixel; and
change the first quantization method to a second quantization method based on a specific condition.

3. The image processing apparatus according to claim 1, wherein the CPU is further configured to:
quantize, by a first quantization method, a reciprocal of a second distance between the second viewpoint corresponding to the second depth image and the polygon at each pixel;
quantize, by a second quantization method, the second distance; and
quantize, by a third quantization method, the reciprocal of the first distance between the first viewpoint and the polygon at each pixel.

4. The image processing apparatus according to claim 3, wherein
the second distance corresponding to the first quantization method and the second quantization method is a distance of a straight line that interconnects the second viewpoint corresponding to the second depth image and the polygon at each pixel, and
the first distance corresponding to the third quantization method is a distance of a straight line that interconnects the first viewpoint and the polygon at each pixel.

5. The image processing apparatus according to claim 3, wherein
the CPU is further configured to select, for each of the first viewpoint and the second viewpoint, a specific quantization method for the first depth image and the second depth image, based on an angle defined by a depth direction of the second texture image of the first viewpoint and a depth direction of the first texture image of the specific viewpoint.

6. The image processing apparatus according to claim 5, wherein
the CPU is further configured to select the first quantization method as the specific quantization method for the first depth image and the second depth image, based on the angle that is:
equal to or greater than 0 degrees,
one of smaller than a first threshold value, or equal to or greater than a second threshold value, and
smaller than 360 degrees,
the first threshold value is smaller than 90 degrees, and
the second threshold value is greater than 270 degrees.

7. The image processing apparatus according to claim 6, wherein
the CPU is further configured to select the second quantization method as the specific quantization method for the first depth image and the second depth image, based on the angle that is:
equal to or greater than the first threshold value,
one of smaller than a third threshold value, or equal to or greater than a fourth threshold value, and
smaller than the second threshold value,
the third threshold value is greater than 90 degrees and smaller than 180 degrees, and
the fourth threshold value is greater than 180 degrees and smaller than 270 degrees.

8. The image processing apparatus according to claim 7, wherein
the CPU is further configured to select the third quantization method as the specific quantization method for the first depth image and the second depth image, based on the angle that is equal to or greater than the third threshold value and smaller than the fourth threshold value.

9. The image processing apparatus according to claim 1, wherein
the polygon is generated based on a plurality of picked up images acquired by a plurality of cameras and a plurality of depth images corresponding to the plurality of picked up images,
the plurality of cameras is around an imaging object corresponding to the polygon, and
at least a part of the imaging object is in an imaging range of each of the plurality of cameras.

10. The image processing apparatus according to claim 9, wherein
the CPU is further configured to generate the first texture image of the specific viewpoint based on a fourth texture image of an omnidirectional image and a third depth image of the omnidirectional image,
generation of the third depth image of the omnidirectional image is based on the plurality of depth images, and
generation of the fourth texture image of the omnidirectional image is based on the plurality of picked up images.

11. An image processing method, comprising:
in an image processing apparatus:

generating a first texture image of a specific viewpoint, based on each of a second texture image of a first viewpoint, a third texture image of a second viewpoint, a first depth image corresponding to the second texture image, and a second depth image corresponding to the third texture image, wherein
  the second texture image is obtained based on projection of a first rear face of a polygon to a first projection face with respect to the first viewpoint,
  the third texture image is obtained based on projection of a second rear face of the polygon to a second projection face with respect to the second viewpoint,
  the first projection face is perpendicular to a first sight line direction,
  the second projection face is perpendicular to a second sight line direction,
  the first sight line direction is from the first viewpoint to a center of the polygon,
  the second sight line direction is from the second viewpoint to the center of the polygon,
  the first viewpoint and the second viewpoint are opposed to each other across the center of the polygon,
  the second texture image corresponds to a first reconstructed portion of the polygon,
  the third texture image corresponds to a second reconstructed portion of the polygon, and
  each of the first reconstructed portion of the polygon and the second reconstructed portion of the polygon is greater than one-half of the polygon; and
quantizing a reciprocal of a distance between the first viewpoint and the polygon at each pixel of the second texture image.

12. An image processing apparatus, comprising:
a central processing unit (CPU) configured to:
  project a first rear face of a polygon to a first projection face perpendicular to a first sight line direction;
  project a second rear face of the polygon to a second projection face perpendicular to a second sight line direction, wherein
    the projection of the first rear face of the polygon is with respect to a first viewpoint,
    the projection of the second rear face of the polygon is with respect to a second viewpoint,
    the first sight line direction is from the first viewpoint to a center of the polygon,
    the second sight line direction is from the second viewpoint to the center of the polygon, and
    the first viewpoint and the second viewpoint are opposed to each other across the center of the polygon;
  generate a first texture image of the first viewpoint based on the projection of the first rear face of the polygon to the first projection face;
  generate a second texture image of the second viewpoint based on the projection of the second rear face of the polygon to the second projection face, wherein
    the first texture image corresponds to a first reconstructed portion of the polygon,
    the second texture image corresponds to a second reconstructed portion of the polygon, and
    each of the first reconstructed portion of the polygon and the second reconstructed portion of the polygon is greater than one-half of the polygon;
  quantize a reciprocal of a first distance between the first viewpoint and the polygon at each pixel of the first texture image;
  obtain a quantization value based on the quantization of the reciprocal of the first distance;
  set the quantization value as a pixel value; and
  generate, based on the pixel value, a first depth image and a second depth image, wherein
    the first depth image corresponds to the first texture image, and
    the second depth image corresponds to the second texture image.

13. The image processing apparatus according to claim 12, wherein CPU is further configured to:
  quantize, by a first quantization method, the reciprocal of the first distance between the first viewpoint and the polygon at each pixel; and
  change the first quantization method to a second quantization method based on a specific condition.

14. The image processing apparatus according to claim 12, wherein CPU is further configured to:
  quantize, by a first quantization method, a reciprocal of a second distance between the second viewpoint corresponding to the second depth image and the polygon at each pixel;
  quantize, by a second quantization method, the second distance; and
  quantize, by a third quantization method, the reciprocal of the first distance between the first viewpoint and the polygon at each pixel.

15. The image processing apparatus according to claim 14, wherein
  the second distance corresponding to the first quantization method and the second quantization method is a distance of a straight line that interconnects the second viewpoint corresponding to the second depth image and the polygon at each pixel, and
  the first distance corresponding to the third quantization method is a distance of a straight line that interconnects the first viewpoint and the polygon at each pixel.

16. The image processing apparatus according to claim 14, wherein the CPU is further configured to transmit each of the first texture image of the first viewpoint, the second texture image of the second viewpoint, the first depth image, and the second depth image.

17. The image processing apparatus according to claim 16, wherein the CPU is further configured to:
  generate first depth images of the first viewpoint and the second viewpoint based on the first quantization method;
  generate second depth images of the first viewpoint and the second viewpoint based on the second quantization method;
  generate third depth images of the first viewpoint and the second viewpoint based on the third quantization method; and
  transmit one of the first depth images, the second depth images, or the third depth images.

18. The image processing apparatus according to claim 12, wherein
  the CPU is further configured to generate the polygon based on a plurality of picked up images acquired by a plurality of cameras and a plurality of depth images corresponding to the plurality of picked up images,
  the plurality of cameras is around an imaging object corresponding to the polygon, and at least a part of the imaging object is in an imaging range of each of the plurality of cameras.

19. The image processing apparatus according to claim 18, wherein the CPU is further configured to:
   generate a third texture image of an omnidirectional image based on the plurality of picked up images; and
   generate a third depth image of the omnidirectional image based on the plurality of depth images.

20. An image processing method, comprising:
   in an image processing apparatus:
      projecting a first rear face of a polygon to a first projection face perpendicular to a first sight line direction,
      projecting a second rear face of the polygon to a second projection face perpendicular to a second sight line direction, wherein
         the projection of the first rear face of the polygon is with respect to a first viewpoint,
         the projection of the second rear face of the polygon is with respect to a second viewpoint,
         the first sight line direction is from the first viewpoint to a center of the polygon,
         the second sight line direction is from the second viewpoint to the center of the polygon, and
         the first viewpoint and the second viewpoint are opposed to each other across the center of the polygon;
      generating a first texture image of the first viewpoint based on the projection of the first rear face of the polygon to the first projection face;
      generating a second texture image of the second viewpoint based on the projection of the second rear face of the polygon to the second projection face, wherein
         the first texture image corresponds to a first reconstructed portion of the polygon,
         the second texture image corresponds to a second reconstructed portion of the polygon, and
         each of the first reconstructed portion of the polygon and the second reconstructed portion of the polygon is greater than one-half of the polygon;
      quantizing a reciprocal of a distance between the first viewpoint and the polygon at each pixel of the first texture image;
      obtaining a quantization value based on the quantization of the reciprocal of the distance;
      setting the quantization value as a pixel value; and
      generating, based on the pixel value, a first depth image and a second depth image, wherein
         the first depth image corresponds to the first texture image, and
         the second depth image corresponds to the second texture image.

21. An image processing apparatus, comprising:
   a central processing unit (CPU) configured to:
      generate a first texture image of a specific viewpoint, based on each of a second texture image of a first viewpoint, a third texture image of a second viewpoint, a first depth image corresponding to the second texture image, and a second depth image corresponding to the third texture image, wherein
         the second texture image is obtained based on projection of a first rear face of a polygon to a first projection face with respect to the first viewpoint,
         the third texture image is obtained based on projection of a second rear face of the polygon to a second projection face with respect to the second viewpoint,
         the first projection face is perpendicular to a first sight line direction,
         the second projection face is perpendicular to a second sight line direction,
         the first sight line direction is from the first viewpoint to a center of the polygon,
         the second sight line direction is from the second viewpoint to the center of the polygon, and
         the first viewpoint and the second viewpoint are opposed to each other across the center of the polygon;
      quantize, by a first quantization method, a reciprocal of a first distance between the first viewpoint and the polygon at each pixel of the second texture image;
      quantize, by a second quantization method, a reciprocal of a second distance between the second viewpoint corresponding to the second depth image and the polygon at each pixel;
      quantize, by a third quantization method, the second distance; and
      select, for each of the first viewpoint and the second viewpoint, a specific quantization method for the first depth image and the second depth image, based on an angle defined by a depth direction of the second texture image of the first viewpoint and a depth direction of the first texture image of the specific viewpoint.

* * * * *